US010264554B2

(12) United States Patent
Choi et al.

(10) Patent No.: US 10,264,554 B2
(45) Date of Patent: Apr. 16, 2019

(54) METHOD AND DEVICE FOR ALLOCATING WIRELESS RESOURCES IN BANDWIDTHS OF DIFFERENT SIZES IN WIRELESS LAN

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 15/517,813

(22) PCT Filed: Oct. 15, 2015

(86) PCT No.: PCT/KR2015/010927
§ 371 (c)(1),
(2) Date: Apr. 7, 2017

(87) PCT Pub. No.: WO2016/060504
PCT Pub. Date: Apr. 21, 2016

(65) Prior Publication Data
US 2017/0311292 A1 Oct. 26, 2017

Related U.S. Application Data

(60) Provisional application No. 62/064,997, filed on Oct. 16, 2014, provisional application No. 62/067,977, filed on Oct. 23, 2014.

(51) Int. Cl.
*H04L 1/00* (2006.01)
*H04L 1/06* (2006.01)
*H04L 5/00* (2006.01)
*H04L 27/26* (2006.01)
*H04W 72/04* (2009.01)
*H04W 84/12* (2009.01)
*H04W 88/08* (2009.01)

(52) U.S. Cl.
CPC ............ *H04W 72/04* (2013.01); *H04L 1/003* (2013.01); *H04L 1/0025* (2013.01);
(Continued)

(58) Field of Classification Search
CPC ..... H04L 1/0002; H04L 1/0025; H04L 1/003; H04L 1/0056; H04L 1/0643;
(Continued)

(56) References Cited

U.S. PATENT DOCUMENTS 9,214,998 B2 * 12/2015 Kenney .................... H04L 1/00
2008/0025267 A1 1/2008 Wei et al.
(Continued)

FOREIGN PATENT DOCUMENTS

WO WO 2013/073921 A1 5/2013

*Primary Examiner* — Eric Nowlin
(74) *Attorney, Agent, or Firm* — Birch, Stewart, Kolasch & Birch, LLP

(57) ABSTRACT

Disclosed are a method and a device for allocating wireless resources in bandwidths of different sizes in a wireless LAN. The method for allocating wireless resources in bandwidths of different sizes in a wireless LAN may comprise steps in which: an AP determines a first resource unit to be allocated to an STA in a first bandwidth; and the AP schedules the first resource unit for the STA, wherein the allocation starting position of the first resource unit allocated in the first bandwidth is configured the same as the allocation starting position of a second resource unit allocated in a second bandwidth, and the allocation starting position of a first guard tone adjacent to the first resource unit may be configured differently from the allocation starting position of a second guard tone adjacent to the second resource unit on the basis of tone shifting.

4 Claims, 19 Drawing Sheets

(52) U.S. Cl.
CPC .......... *H04L 1/0056* (2013.01); *H04L 5/0007*
(2013.01); *H04L 5/0053* (2013.01); ***H04L
27/2602* (2013.01); *H04W 72/0453*** (2013.01);
*H04W 84/12* (2013.01); *H04W 88/08*
(2013.01); *H04L 1/0002* (2013.01); *H04L
1/0643* (2013.01); *H04L 5/0048* (2013.01);
*H04L 5/0091* (2013.01)

(58) Field of Classification Search
CPC ... H04L 5/0007; H04L 5/0053; H04L 5/0091;
H04L 27/2602; H04W 72/04; H04W
84/12; H04W 88/08
See application file for complete search history.

(56) References Cited

U.S. PATENT DOCUMENTS

| | | | |
|---|---|---|---|
| 2009/0147832 A1* | 6/2009 | Kim ..................... H04L 5/0037 375/144 |
| 2010/0002675 A1* | 1/2010 | Fu .......................... H04L 5/0007 370/343 |
| 2011/0026623 A1 | 2/2011 | Srinivasa et al. |
| 2011/0255620 A1 | 10/2011 | Jones, IV et al. |
| 2014/0169356 A1 | 6/2014 | Noh et al. |
| 2015/0085946 A1* | 3/2015 | Kenney ..................... H04L 1/00 375/267 |
| 2016/0080043 A1* | 3/2016 | Tian ...................... H04B 7/022 375/267 |
| 2016/0302200 A1* | 10/2016 | Yang ................. H04W 72/0446 |
| 2017/0230952 A1* | 8/2017 | Choi .................... H04W 72/042 |
| 2017/0273083 A1* | 9/2017 | Chen ..................... H04L 1/0071 |
| 2017/0280453 A1* | 9/2017 | Choi ..................... H04W 72/08 |
| 2017/0311292 A1* | 10/2017 | Choi ..................... H04W 72/04 |
| 2017/0373808 A1* | 12/2017 | Park ........................ H04L 5/005 |
| 2018/0006781 A1* | 1/2018 | Choi ...................... H04L 27/26 |
| 2018/0048436 A1* | 2/2018 | Park ........................ H04L 5/0007 |
| 2018/0124788 A1* | 5/2018 | Choi ......................... H04L 5/00 |
| 2018/0145811 A1* | 5/2018 | Park ...................... H04L 69/323 |
| 2018/0212725 A1* | 7/2018 | Park ....................... H04L 27/26 |

* cited by examiner

FIG. 1
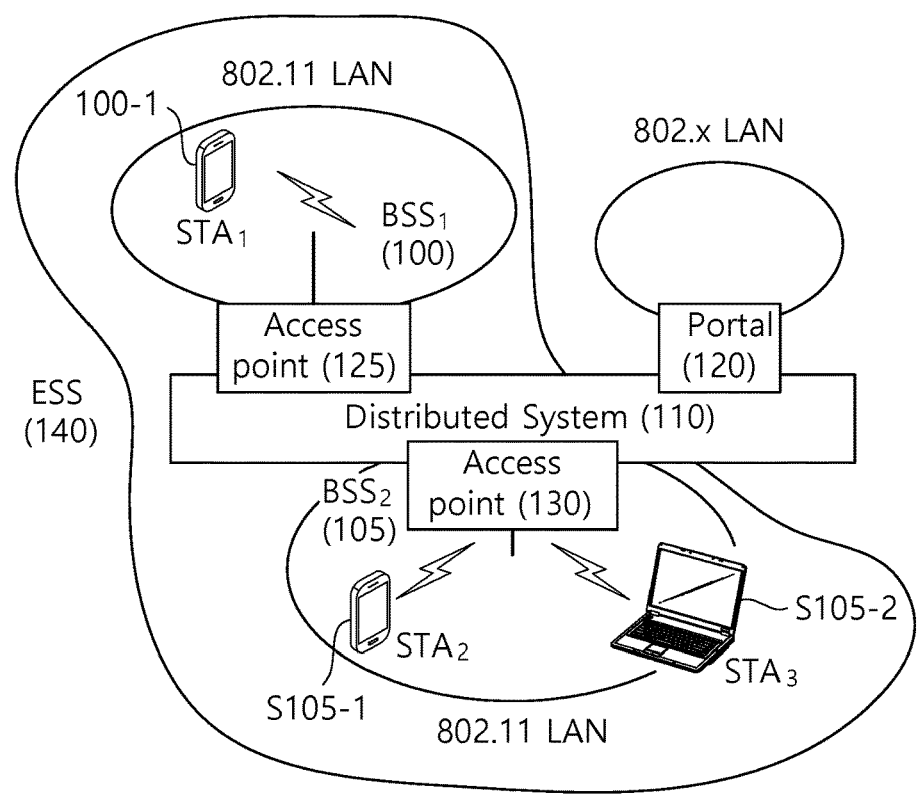
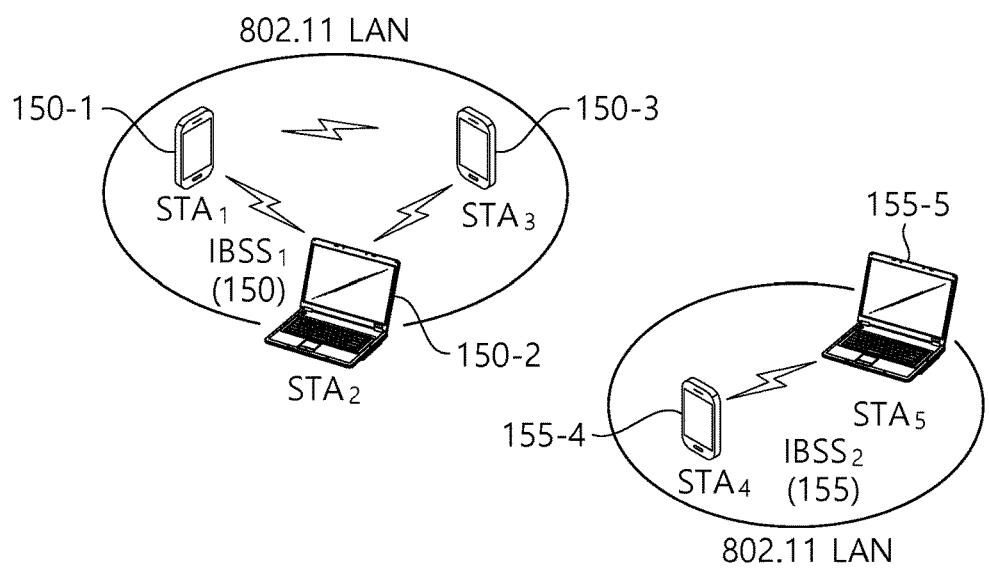

METHOD AND DEVICE FOR ALLOCATING WIRELESS RESOURCES IN BANDWIDTHS OF DIFFERENT SIZES IN WIRELESS LAN

CROSS REFERENCE TO RELATED APPLICATIONS

This application is the National Phase of PCT International Application No. PCT/KR2015/010927, filed on Oct. 15, 2015, which claims priority under 35 U.S.C. 119(e) to U.S. Provisional Application Nos. 62/064,997, filed on Oct. 16, 2014 and 62/067,977 filed on Oct. 23, 2014, all of which are hereby expressly incorporated by reference into the present application.

BACKGROUND OF THE INVENTION

Field of the Invention

The present invention relates to mobile communication, more particularly a method and a device for allocating wireless resources in bandwidths of different sizes in a wireless LAN (Local Area Network).

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAB) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service configure (OBSS) environment and improvement of outdoor environment performance, and cellular offloading are anticipated to be actively discussed rather than improvement of single link performance in one basic service configure (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

One purpose of the present invention is to provide a method for allocating wireless resources in bandwidths of different sizes in a wireless LAN.

Another purpose of the present invention is to provide a device for allocating wireless resources in bandwidths of different sizes in a wireless LAN.

In a wireless LAN in accordance with an aspect of the present invention for achieving purposes of the present invention, a method for allocating wireless resources in bandwidths of different sizes may comprises steps of determining, by an access point (AP), a first resource unit to be allocated to a station (STA) in a first bandwidth, and scheduling, by the AP, the first resource unit for the STA, and wherein an allocation start position of the first resource unit allocated in the first bandwidth may be configured the same as an allocation start position of a second resource unit allocated on a second bandwidth, and wherein an allocation start position of a first guard tone adjacent to the first resource unit may be configured differently from an allocation start position of a second guard tone adjacent to the second resource unit on the basis of tone shifting.

In a wireless LAN in accordance with another aspect of the present invention for achieving purposes of the present invention, an access point (AP) for allocating wireless resource in bandwidths of different sizes in a wireless LAN (Local Area Network), comprising a radio frequency (RF) unit configured to transmit and receive radio signal, and a processor configured operatively coupled to the RF unit, and wherein the processor is configured to determine a first resource unit to be allocated to a station (STA) in a first bandwidth, and schedule the first resource unit for the STA, and wherein an allocation start position of the first resource unit allocated in the first bandwidth may be configured the same as an allocation start position of a second resource unit allocated on a second bandwidth, and wherein an allocation start position of a first guard tone adjacent to the first resource unit may be configured differently from an allocation start position of a second guard tone adjacent to the second resource unit on the basis of tone shifting.

Interferences may be mitigated among STAs operated in bandwidths of different sizes.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
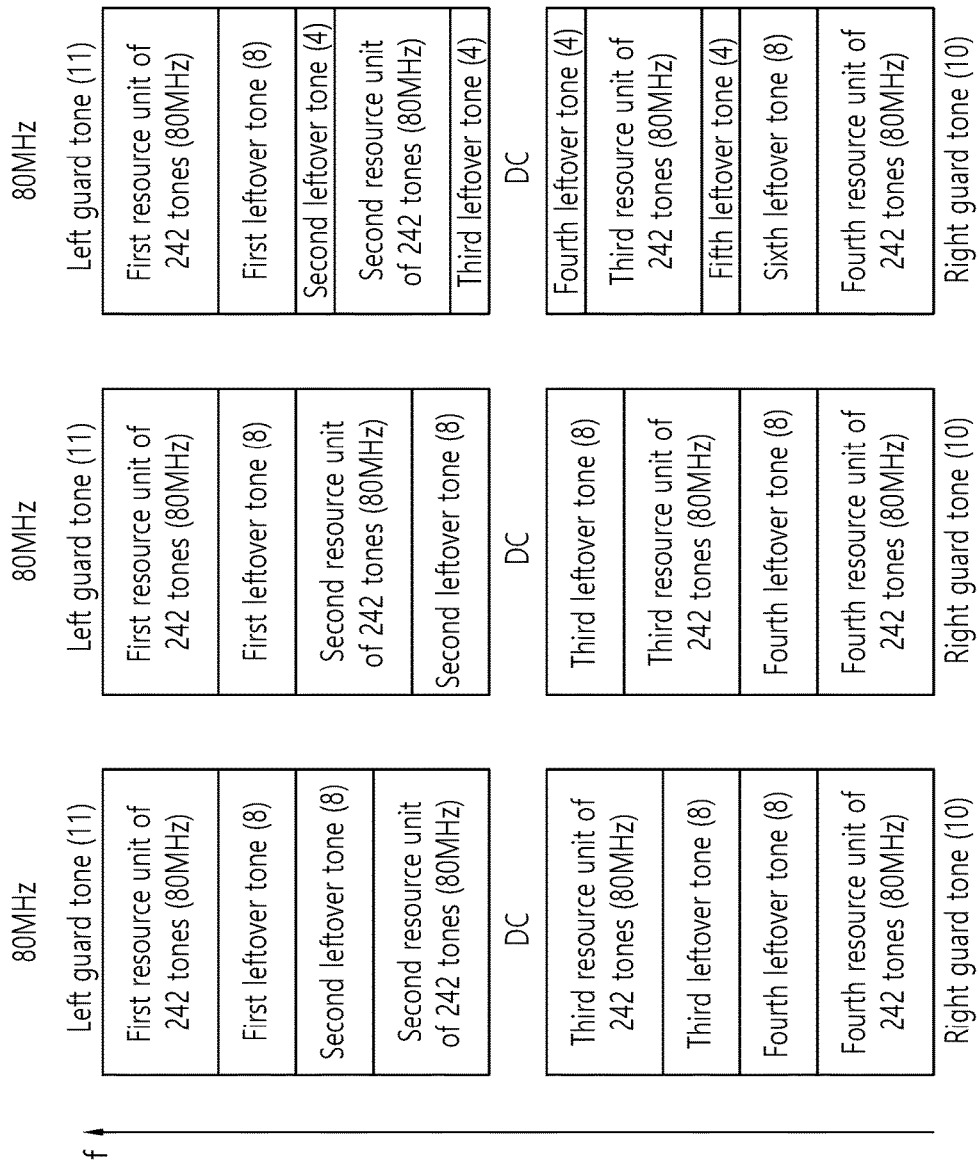
FIG. 2 is a conceptual view illustrating a method for allocating resources on 80 MHz bandwidth in accordance with an embodiment of the present invention.

FIG. 1 is a conceptual view illustrating the structure of a wireless local area network (WLAN).

An upper part of FIG. 1 illustrates the structure of an infrastructure basic service configure (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a configure of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service configure (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service configure identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service configure (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the conventional wireless LAN system, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In the wireless LAN system according to the embodiment, an orthogonal frequency division multiple access (OFDMA) based transmission method is supported for the uplink transmission and/or downlink transmission. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource unit (RUs) (alternatively, basic tone unit or small tone unit). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources unit (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

An example of a time-frequency structure, which is assumed in the Wireless LAN system according to this exemplary embodiment may be as described below.

A fast fourier transform (FFT) size/inverse fast fourier transform (IFFT) size may be defined as N-times (wherein N is an integer, e.g., N=4) of the FFT/IFFT sizes that were used in the legacy WirelessLAN system. More specifically, as compared to the first part of the HE PPDU, the 4-times size of the FFT/IFFT may be applied to the second part of the HE PPDU. For example, 256 FFT/IFFT may be applied for a 20 MHz bandwidth, 512 FFT/IFFT may be applied for a 40 MHz bandwidth, 1024 FFT/IFFT may be applied for an 80 MHz bandwidth, and 2048 FFT/IFFT may be applied to a continuous 160 MHz bandwidth or a non-continuous 160 MHz bandwidth.

Subcarrier space/spacing may correspond to a 1/N-times size (wherein N is an integer, e.g., when N=4, 78.125 kHz) of the subcarrier spacing that was used in the legacy WirelessLAN system.

An IDFT/DFT length (or valid symbol length) that is based on inverse discrete fourier transform (IDFT)/discrete fourier transform (DFT) (or FFT/IFFT) may correspond to N-times of the IDFT/DFT length in the legacy WirelessLAN system. For example, in the legacy WirelessLAN system, in case the IDFT/DFT length is equal to 3.2 µs and N=4, in the WirelessLAN system according to this exemplary embodiment, the IDFT/DFT length may be equal to 3.2 µs*4(=12.8 µs).

The length of an OFDM symbol may correspond to the IDFT/DFT length having a length of a guard interval (GI) added thereto. The length of the GI may have diverse values, such as 0.4 µs, 0.8 µs, 1.6 µs, 2.4 µs, and 3.2 µs.

When an OFDMA-based resource allocation method according to an embodiment of the present invention is used, the resource allocation unit defined by different sizes may be used. Specifically, a basic tone unit (BTU) and a small tone unit (STU) may be defined for the resource allocation based on the OFDMA.

The AP may determine DL transmission resource and/or UL transmission resource for at least one STA based on such various resource unit. The AP may transmit at least one PPDU to at least one STA through the scheduled DL transmission resource. Further, the AP may receive at least one PPDU transmitted by at least one STA through the DL transmission resource.

In comparison with the STU, the BTU may be a relatively larger size resource unit. For example, the BTU may be defined as the size of 56 tones, 114 tones or the like. The BTU may be defined as the same size irrespective of the size of the available bandwidth (e.g., 20 MHz, 40 MHz, 80 MHz, 160 MHz, etc.) or defined as a size which is changed depending on the size of the available bandwidth. For example, the size of the BTU may be defined as a relatively large value as the size of the available bandwidth increases. The tone may be understood as the same as the subcarrier.

In comparison with the BTU, the STU may be a relatively small size resource unit. For example, the STU may be defined as the size of 26 tones.

Resource unit such as BTU and STU may be allocated on the entire bandwidth (or available bandwidth) in consideration of the left guard tone and the right guard tone which are located at both ends of the entire bandwidth and are used to reduce interference, and the direct current (DC) tone located in the center of the entire bandwidth. Further, the resource unit such as BTU and STU may be allocated in consideration of a leftover tone which may be used for user allocation separation (or resource allocation for each STA), a common pilot, an automatic gain control (AGC), a phase tracking, etc.

In the entire bandwidth, the allocation method (allocated number, allocation location, etc) of the resource unit such as BTU and STU on the entire bandwidth may be configure in consideration of the resource utilization efficiency and the scalability (or extensibility) according to the entire bandwidth. The allocation method of resource unit such as BTU and STU may be defined in advance or signaled based on various methods (e.g., a signaling based on a signal field included in the PPDU header of the PPDU).

Further, according to an embodiment of the present invention, a virtual allocation resource unit including a tone corresponding to a combination of at least one BTU and/or at least one STU is defined, and a resource allocation based on the virtual allocation resource unit may be performed. The resource allocation based on the virtual allocation resource unit may be referred to as virtualization in another expression.

The virtual allocation resource unit may be a resource unit for reusing the interleaver size and OFDM numerology (or tone numerology) of the existing WLAN system. Alternatively, the virtual allocation resource unit may be defined as a resource unit larger than a BTU, STU corresponding to a tone corresponding to a combination of at least one BTU and at least one STU. For example, a virtual allocation resource unit may be 242 tones combining two BTUs and five STUs, or a virtual allocated resource unit may be 484 tones combining four BTUs and ten STUs.

Specifically, when 242 tones corresponding to two BTUs and five STUs are allocated to one STA, existing pilot allocation and existing interleaver size may be utilized. Specifically, pilot tones may be allocated to 8 tones of 242 tones and data tones may be allocated to the remaining 234 tones. For the data tones having 234 tones, interleaving may be performed based on an interleaver having 234 sizes.

In this case, the data interleaving procedure and the pilot tone insertion procedure may be performed in the same manner as the STA allocated to the existing 242 tones. That is, even if the 242 tone structure is not physically supported, a virtual resource unit of 242 tones may be allocated to the STA. In this case, an interleaving procedure using the existing interleaver having 234 sizes and an insertion procedure of an existing pilot tone (8 pilot tones) may be used. These resource units of 242 tones may be expressed in terms of virtual allocated resource unit. The virtual allocated resource unit may be 242 tones or a multiple of 242 tones (e.g., 484, 968, etc.). Or, the size of the virtual allocated resource unit may be determined based on other interleaver sizes (108, 52, 24, etc.) used in the existing WLAN system. Or, a virtual allocation resource unit may include a plurality of data tones defined as a larger resource unit than a BTU, STU corresponding to a tone corresponding to a combination of at least one BTU and at least one STU and interleaved by a newly defined interleaver size.

According to an embodiment of the present invention, the tone numerology for each of the bandwidths of 20 MHz, 40 MHz and 80 MHz may be as follows. A method for allocating resources of each bandwidth below is one example, and the resource allocation on each bandwidth may be performed in various methods.

For the 20 MHz bandwidth, a left guard tone is defined as 6 tones, a DC (direct current) tone is defined as 3 tones, and the right guard tone is defined as 5 tones, and two resource unit of 56 tones, and five resource unit of 26 tones may be allocated on the bandwidth. Or nine resource units of 26 tones may be allocated as virtual allocated resource unit.

A specific allocation on the 20 MHz frequency band may be 56/26/26/13/DC/13/26/26/56 or 26/26/13/56/DC/56/13/26/26. Here, 56 refer to the resource unit of 56 tones, 26 refer to the resource unit of 26 tones, and 13 refer to the resource unit of 13 tones that divides 26 tones into halves.

For the 40 MHz bandwidth, the left guard tone is defined as 6 tones, the DC tones is defined as 9 tones, the right guard tone is defined as 5 tones, the remaining 492 tones are divided into two parts, and three resources unit of 56 tones of and three resource unit of 26 tones may be allocated to each of the 492 tones which is divided into two parts. The specific allocation on the 40 MHz frequency band may be 56/56/26/26/26/56/DC/56/26/26/26/56/56.

Alternatively, for the 40 MHz bandwidth, the left guard tone is defined as 6 tones, the DC tone is defined as 5 tones, and the right guard tone is defined as 5 tones, and seven resource units of 56 tones and four resource unit of 26 tones resource unit may be allocated to the remaining 496 tones. The specific allocation on the 40 MHz frequency band may be 56/56/26/26/56/28/DC/28/56/26/26/56/56. Here, 28 indicate the resource unit of 28 tones divided 56 tones into halves.

For the 80 MHz bandwidth, the left guard tone is defined as 11 tones, the DC tone is defined as 3 tones, and the right guard tone is defined as 10 tones. The remaining 1000 tones are divided into four and four resources unit of 56 tones and one resource unit of 26 tones may be allocated to each of the 1000 tones which is divided into four. Nine resource units of 26 tones may be allocated to each of the four units of 250 tones corresponding to 20 MHz or 40 MHz. The specific allocation on the 40 MHz frequency band may be 56/56/56/56/56/56/56/56/56/56/56/56/56/56/56/26/26/56/56.

Hereinafter, in the embodiment of the present invention, a tone numerology is disclosed to reduce mutual interference in a wireless LAN system in which a terminal which uses the 20 MHz bandwidth as a front-end bandwidth, a terminal which uses the 40 MHz bandwidth as the front-end bandwidth, and a terminal which uses the 80 MHz bandwidth as the front-end bandwidth, are coexisting with each other.

Hereinafter, disclosed is a method of allocating resources (or tone plan) for coexistence among terminals supporting front-ends of different sizes based on virtual allocated resource unit of 242 tones (or resource unit of 242 tones).

FIG. 2 is a conceptual view illustrating a method for allocating resources on 80 MHz bandwidth in accordance with an embodiment of the present invention.

In FIG. 2, when the left-most guard tone (or left guard tone) of 11 tones, the DC tone of 3 tones, and the right-most guard tone of 10 tones (or right guard tone) in the 80 MHz front-end bandwidth (Or the right guard tone) is assumed, the allocation of resource unit on the remaining 1000 tones (1024 tones−24 tones) is initiated.

Here, 1000 tones may be divided into four 250 tones (data tone of 242 tones and leftover tone of 8 tones).

Referring to the left side of FIG. 2, 11 (left guard tone)/242/8/8/242/DC/242/8/8 /242/10 (right guard tone) may be allocated on a bandwidth of 80 MHz. Here, 242 indicate the resource unit of 242 tones and 8 indicates 8 leftover tones.

A plurality of eight leftover tones may be contiguously allocated between the resource unit of 242 tones. The leftover tones located between the resource unit of 242 tones may be used as guard tones. Two leftover tones of 8 tones (total 16 tones leftover tones) are located between the resource unit of 242 tones adjacent to DC tones and the resource unit of 242 tones adjacent to the left guard tone, while two leftover tones of 8 tones (total 16 tones) may be located between the resource unit of 242 tones adjacent to DC tones and the resource unit of 242 tones adjacent to the right guard tone.

Referring to the middle of FIG. 2, 11 (left guard tone)/ 242/8/242/8/DC/8/242/8 /242/10 (right guard tone) may be allocated on the bandwidth of 80 MHz. Eight leftover tones may be located within the resource unit of 242 tones and adjacent to the DC tones (or between the resource unit of 242 tones and the DC tones).

Referring to the right side of FIG. 2, 11 (left guard tone)/242/8/4/242/4/DC/4/ 242/4/8/242/10 (right guard tone) may be allocated on the bandwidth of 80 MHz. Four leftover tones may be allocated at a position adjacent to the DC tones and four leftover tones and eight leftover tones may be located adjacent to the resource unit of 242 tones adjacent to the left guard tone. In addition, four leftover tones and eight leftover overtones may be located adjacent to the resource unit of 242 tones adjacent to the right guard tone.

Figure 3:
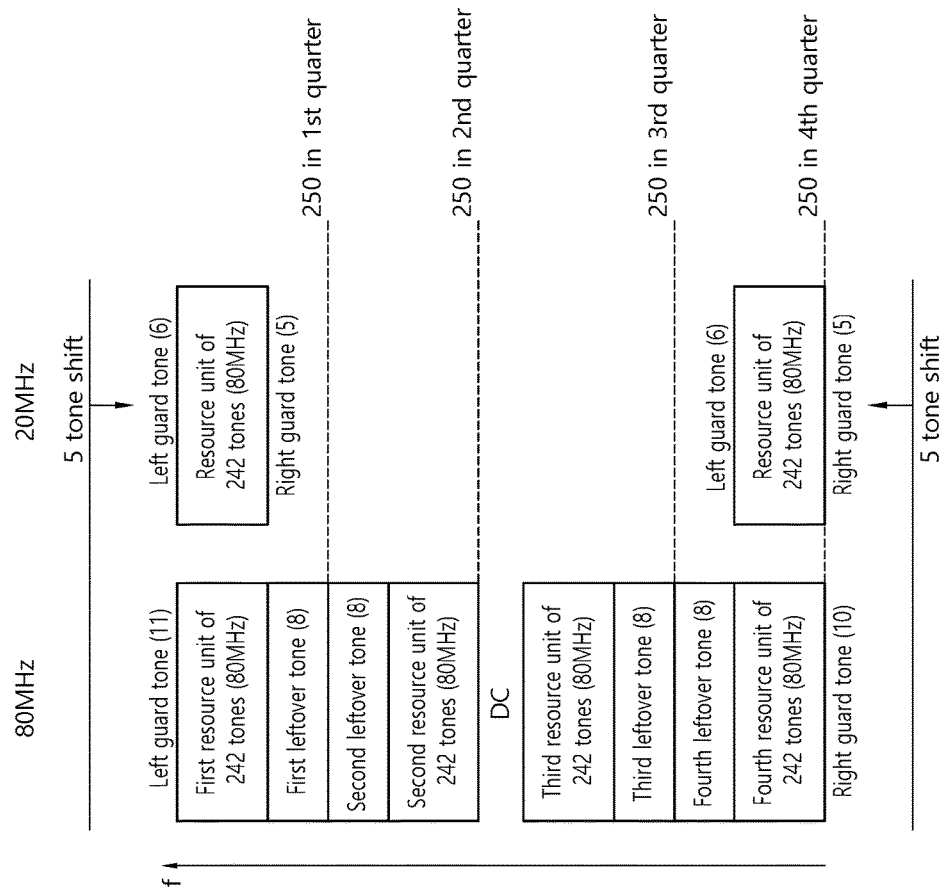
FIG. 3 is a conceptual view illustrating a method for allocating resources on 20 MHz bandwidth in accordance with an embodiment of the present invention.

FIG. 3 is a conceptual view illustrating a method for allocating resources on 20 MHz bandwidth in accordance with an embodiment of the present invention.

In FIG. 3, disclosed is the tone numerology (or resource allocation on the 20 MHz bandwidth) for an STA with the 20 MHz front-end bandwidth considering resource allocation on the 80 MHz bandwidth disclosed on the left side of FIG. 2.

Referring to FIG. 3, on the 80 MHz bandwidth, the left guard tone of 11 tones, a first resource unit of 242 tones (80 MHz), a first leftover tone of 8 tones, a second leftover ton of 8 tones, a second resource unit of 242 tones (80 MHz), the DC tone, a third resource unit of 242 tones (80 MHz), a third leftover tones of 8 tones, a fourth leftover tones of 8 tones, a fourth resource unit of 242 tones (80 MHz), and the right guard tone of 10 tones may be allocated.

Here, the left guard tones of 6 tones, the resource unit of 242 tones (20 MHz), and the right guard tones of 5 tones may be allocated on the 20 MHz bandwidth.

Hereinafter, in FIGS. 3 to 5, although the DC tone is not considered for convenience of description, n DC tones may be included in the center position in the resource unit of 242 tones. In this case, the left guard tones of 6 tones, the resource unit of 242 tones (20 MHz)+DC tones, and the right guard tones of 5 tones may be allocated on the 20 MHz bandwidth.

For example, the allocation position of the first resource unit of 242 tones (80 MHz) adjacent to the left guard tone of 11 tones allocated on the 80 MHz bandwidth is configured to be the same as the allocation position of the resource unit of 242 tones (20 MHz) allocated on the 20 MHz bandwidth.

In order to configure the allocation positions of the first resource unit 242 tones (80 MHz) and the resource unit of 242 tone (20 MHz) allocated on the 20 MHz bandwidth to be the same on a frequency axis, an allocation start position of the left guard tone defined on the 20 MHz bandwidth may be a position shifted by five tones in a direction in which the frequency is decreased from the allocation start position of the left guard tone defined on the 80 MHz bandwidth.

That is, in order to configure the allocation positions of the first resource unit of 242 tone (80 MHz) and the resource unit of 242 tone (20 MHz) allocated on the 20 MHz bandwidth to be the same, the allocation start position of the 20 MHz bandwidth may be shifted by five tones in the direction in which in which the frequency is decreased based on the allocation start position of the 80 MHz bandwidth.

On the other hand, in order to configure the allocation positions of the first resource unit of 242 tones (80 MHz) and the resource unit of 242 tones (20 MHz) allocated on the 20 MHz bandwidth to be the same, the allocation start position of the 20 MHz bandwidth is fixed, while the allocation start position of the 80 MHz bandwidth may be shifted by five tones in the direction in which in which the frequency is increased.

Alternatively, the allocation positions of the fourth resource unit of the 242 tones (80 MHz) adjacent to the right guard tones of 10 tones allocated on the 80 MHz bandwidth may be configured to be the same as the allocation positions of the resource unit of 242 tones (20 MHz) allocated on the 20 MHz bandwidth. In this case, the allocation start position of the right guard tone defined on the 20 MHz bandwidth may be a position shifted by five tones in the direction which the frequency is increased than the allocation start position of the right guard tone defined on the 80 MHz bandwidth.

That is, in order to configure the allocation positions of the resource unit of 242 tones (80 MHz) and the resource unit of 242 tones (20 MHz) allocated on the 20 MHz bandwidth to be the same, the allocation start position of the 20 MHz bandwidth may be shifted by five tones in the direction in which the frequency is increased based on the allocation start position of the 80 MHz bandwidth.

On the other hand, in order to configure the allocation positions of the fourth resource unit of 242 tones (80 MHz) and the resource unit of 242 tones (20 MHz) allocated on the 20 MHz bandwidth to be the same, the allocation start position of the 20 MHz bandwidth is fixed, while the allocation start position the 80 MHz bandwidth may be shifted by five tones in the direction in which the frequency is decreased.

No additional shifting is required to configure the allocation positions of the second resource unit of 242 tones (80 MHz) to be the same as and the resource unit of 242 tones (20 MHz) allocated on the 20 MHz bandwidth. Similarly, in order to configure the allocation positions of the third resource unit of 242 tones (80 MHz) to be the same as the resource unit of 242 tones (20 MHz) allocated on the 20 MHz bandwidth, no additional shifting is required.

Figure 4:
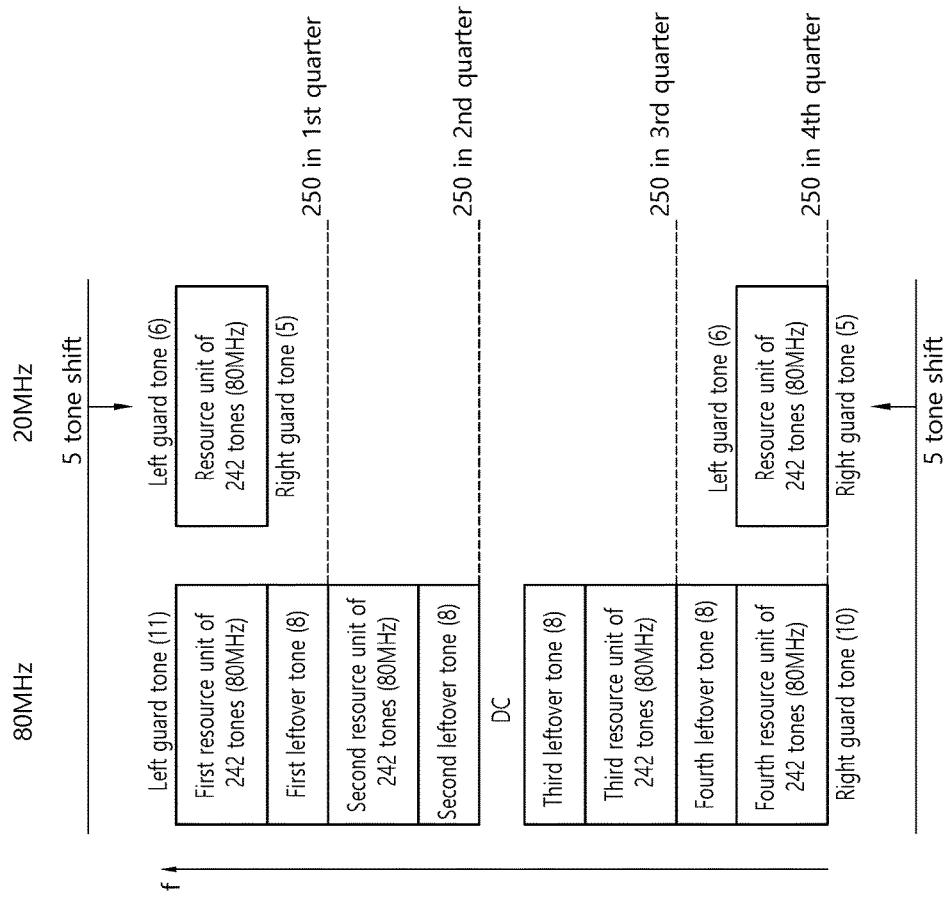
FIG. 4 is a conceptual view illustrating a method for allocating resources on 20 MHz bandwidth in accordance with an embodiment of the present invention.

FIG. 4 is a conceptual view illustrating a method for allocating resources on 20 MHz bandwidth in accordance with an embodiment of the present invention.

In FIG. 4, disclosed is the tone numerology for STAs having the 20 MHz front-end bandwidth considering resource allocation on the 80 MHz bandwidth disclosed in the middle part of FIG. 2.

Referring to FIG. 4, on the 80 MHz bandwidth, the left guard tone of 11 tones, a first resource unit of 242 tones (80 MHz), a first leftover tone of 8 tones, a second resource unit of 242 tones (80 MHz), a second leftover ton of 8 tones, the DC tone, a third leftover tones of 8 tones, a third resource unit of 242 tones (80 MHz), a fourth leftover tones of 8 tones, a fourth resource unit of 242 tones (80 MHz), and the right guard tone of 10 tones or the like may be allocated.

The left guard tones of 6 tones, the resource unit of 242 tones (20 MHz), and the right guard tones of 5 tones may be allocated to the 20 MHz bandwidth.

For example, the allocation position of the first resource unit of 242 tones (80 MHz) adjacent to the left guard tone of 11 tones allocated on the 80 MHz bandwidth may be configured to be the same as the allocation position of the resource unit of 242 tones (20 MHz) allocated on the 20 MHz bandwidth. In order to configure the allocation positions of the first resource unit of 242 tones (80 MHz) and the resource unit of 242 tones (20 MHz) allocated on the 20 MHz bandwidth to be the same on the frequency axis, the allocation start position of the left guard tone defined on the 20 MHz bandwidth may be a position shifted by five tones in a direction in which the frequency decreases from the allocation start position of the left guard tone defined on the 80 MHz bandwidth.

On the other hand, in order to configure the allocation positions of the first resource unit of 242 tones (80 MHz) and the resource unit of 242 tones (20 MHz) allocated on the 20 MHz bandwidth to be the same, the allocation start position of the 20 MHz bandwidth is fixed, while the allocation start position of the 80 MHz bandwidth may be shifted by five tones in the direction in which the frequency is increased.

Alternatively, the allocation positions of the fourth resource unit (80 MHz) of the 242 tones adjacent to the right guard tones of 10 tones allocated on the 80 MHz bandwidth may be configured to be the same as the allocation positions of the resource unit of 242 tones (20 MHz) allocated on the 20 MHz bandwidth. In this case, the allocation start position of the right guard tone defined on the 20 MHz bandwidth may be a position shifted by five tones in the direction in which the frequency is increased than the allocation start position of the right guard tone defined on the 80 MHz bandwidth.

That is, in order to configure the allocation positions of the resource unit of 242 tones (80 MHz) and the resource unit of 242 tones (20 MHz) allocated on the 20 MHz bandwidth to be the same, the allocation start position of the 20 MHz bandwidth may be shifted by five tones in the direction in which the frequency is increased based on the allocation start position of the 80 MHz bandwidth.

On the other hand, in order to configure the allocation positions of the fourth resource unit of 242 tones (80 MHz) and the resource unit of 242 tones (20 MHz) allocated on the 20 MHz bandwidth to be the same, the allocation start position of the 20 MHz bandwidth is fixed, while the allocation start position of the 80 MHz bandwidth may be shifted by five tones in the direction in which the frequency is decreased.

No additional shifting is required to configure the allocation positions of the second resource unit of 242 tones (80 MHz) and the resource unit of 242 tones (20 MHz) allocated on the 20 MHz bandwidth to be the same. Similarly, in order to configure the allocation positions of the third resource unit of 242 tones (80 MHz) and the resource unit of 242 tones (20 MHz) allocated on the 20 MHz bandwidth to be the same, no additional shifting is required.

Figure 5:
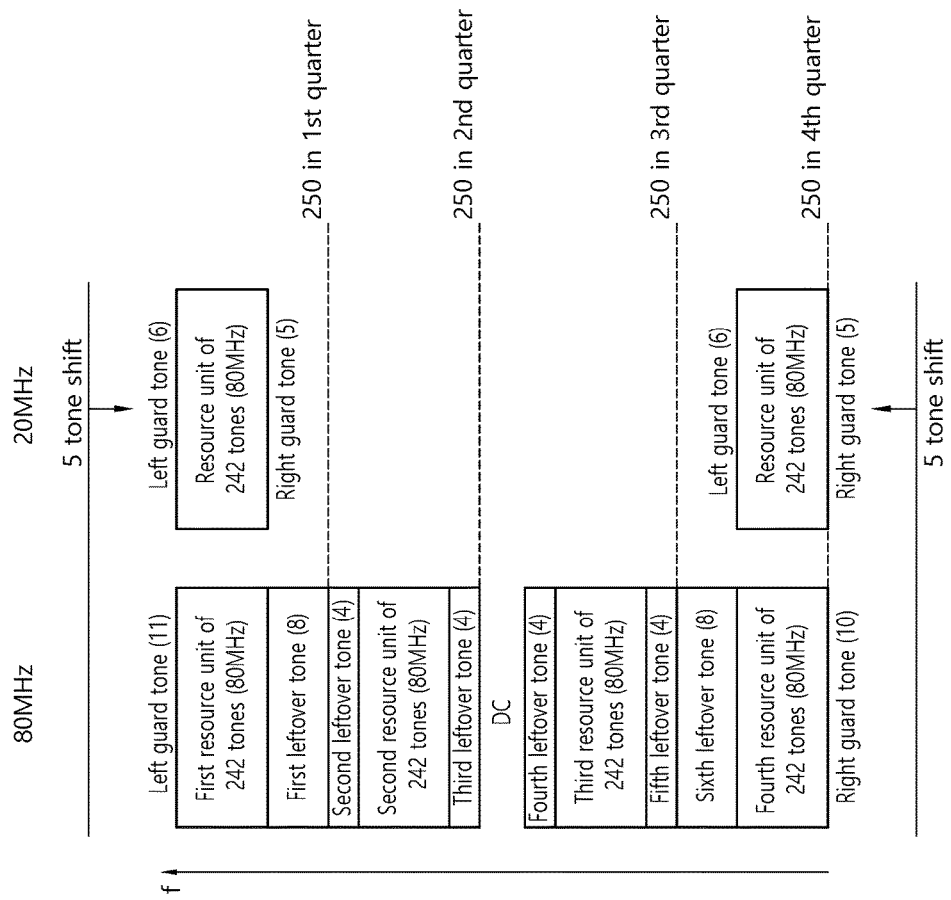
FIG. 5 is a conceptual view illustrating a method for allocating resources on 20 MHz bandwidth in accordance with an embodiment of the present invention.

FIG. 5 is a conceptual view illustrating a method for allocating resources on 20 MHz bandwidth in accordance with an embodiment of the present invention.

In FIG. 5, disclosed is the tone numerology for STAs with the 20 MHz front-end bandwidth considering resource allocation on the 80 MHz bandwidth disclosed on the right side of FIG. 2.

Referring to FIG. 5, on the 80 MHz bandwidth, the left guard tone of 11 tones, a first resource unit of 242 tones (80 MHz). a first leftover tone of 8 tones, a second leftover ton of 4 tones, a second resource unit of 242 tones (80 MHz), a second leftover ton of 4 tones, the DC tone, a third resource unit of 242 tones (80 MHz), a fourth leftover tones of 4 tones, a third resource unit of 242 tones (80 MHz), a fifth leftover tones of 4 tones, a fifth leftover tones of 8 tones, a fourth resource unit of 242 tones (80 MHz), and the right guard tone of 10 tones may be allocated.

The left guard tone of 6 tones, the resource unit of 242 tones (20 MHz), and the right guard tones of 5 tones may be allocated on the 20 MHz bandwidth.

For example, the allocation position of the first resource unit of 242 tones (80 MHz) adjacent to the left guard tone of 11 tones allocated on the 80 MHz bandwidth may be configure to be the same as the allocation position of the resource unit of 242 tones (20 MHz) allocated on the 20 MHz bandwidth. In order to configure the allocation positions of the first resource unit of 242 tones (80 MHz) and the resource unit of 242 tones (20 MHz) allocated on the 20 MHz bandwidth to be same on the frequency axis, the allocation start position of the left guard tone defined on the 20 MHz bandwidth may be a position shifted by five tones in a direction in which the frequency decreases than the allocation start position of the left guard tone defined on the 80 MHz bandwidth.

On the other hand, in order to configure the allocation positions of the first resource unit of 242 tones (80 MHz) and the resource unit of 242 tones (20 MHz) allocated on the 20 MHz bandwidth to be the same, the allocation start position of the 20 MHz bandwidth is fixed, while the allocation start position of the 80 MHz bandwidth may be shifted by 5 tones in the direction in which the frequency is increased.

Alternatively, the allocation positions of the fourth resource unit (80 MHz) of 242 tones adjacent to the right guard tones of 10 tones allocated on the 80 MHz bandwidth may be configure to be same as the allocation positions of the resource unit of 242 tones (20 MHz) allocated on the 20 MHz bandwidth. In this case, the allocation start position of the right guard tone defined on the 20 MHz bandwidth may be a position shifted by 5 tones in the direction in which the frequency is increased than the allocation start position of the right guard tone defined on the 80 MHz bandwidth.

That is, in order to configure the allocation positions of the resource unit of 242 tones (80 MHz) and the resource unit of 242 tones (20 MHz) allocated on the 20 MHz bandwidth to be the same, the allocation start position of the 20 MHz bandwidth may be shifted by five tones in the direction in which the frequency is increased based on the allocation start position of the 80 MHz bandwidth.

On the other hand, in order to configure the allocation positions of the resource unit of 242 tones (80 MHz) and the resource unit of 242 tones (20 MHz) allocated on the 20 MHz bandwidth to be the same, the allocation start position of the 20 MHz bandwidth is fixed, while the allocation start position of the 80 MHz bandwidth may be shifted by five tones in the direction in which the frequency is decreased.

No additional shifting is required to configure the allocation positions of the second resource unit of 242 tones (80 MHz) and the resource unit of 242 tones (20 MHz) allocated on the 20 MHz bandwidth to be the same. Similarly, in order to configure the allocation positions of the third resource unit of 242 tones (80 MHz) and the resource unit of 242 tones (20 MHz) allocated on the 20 MHz bandwidth to be the same, no additional shifting is required.

In FIGS. 2 to 5, the left guard tones of 8 tones and the left guard tones of 4 tones are disclosed, but the left guard tones of 8 tones may be allocated to be classifiedd into 5 tones and 3 tones.

That is, when allocating wireless resources on bandwidths of different sizes in the wireless LAN, the AP determines a first resource unit to be allocated to the STA (station) in the first bandwidth (e.g., 20 MHz), and may schedule the first resource unit for the STA. In this case, the allocation start position of the first resource unit allocated on the first bandwidth may be configured to be the same as the allocation start position of the second resource unit allocated on the second bandwidth (for example, 80 MHz), and the allocation start position of the first guard tone adjacent to the first resource unit may be configured to be different from the allocation start position of the second guard tone adjacent to the second resource unit based on tone shifting. In this case, the first resource unit includes the resource unit of 242 tones, the second resource unit includes the resource unit of 242 tones, the size of the tone shifting may be determined on the basis of difference between the number of tones allocated to the first guard tone and the number of tones allocated to the second guard tone.

Figure 6:
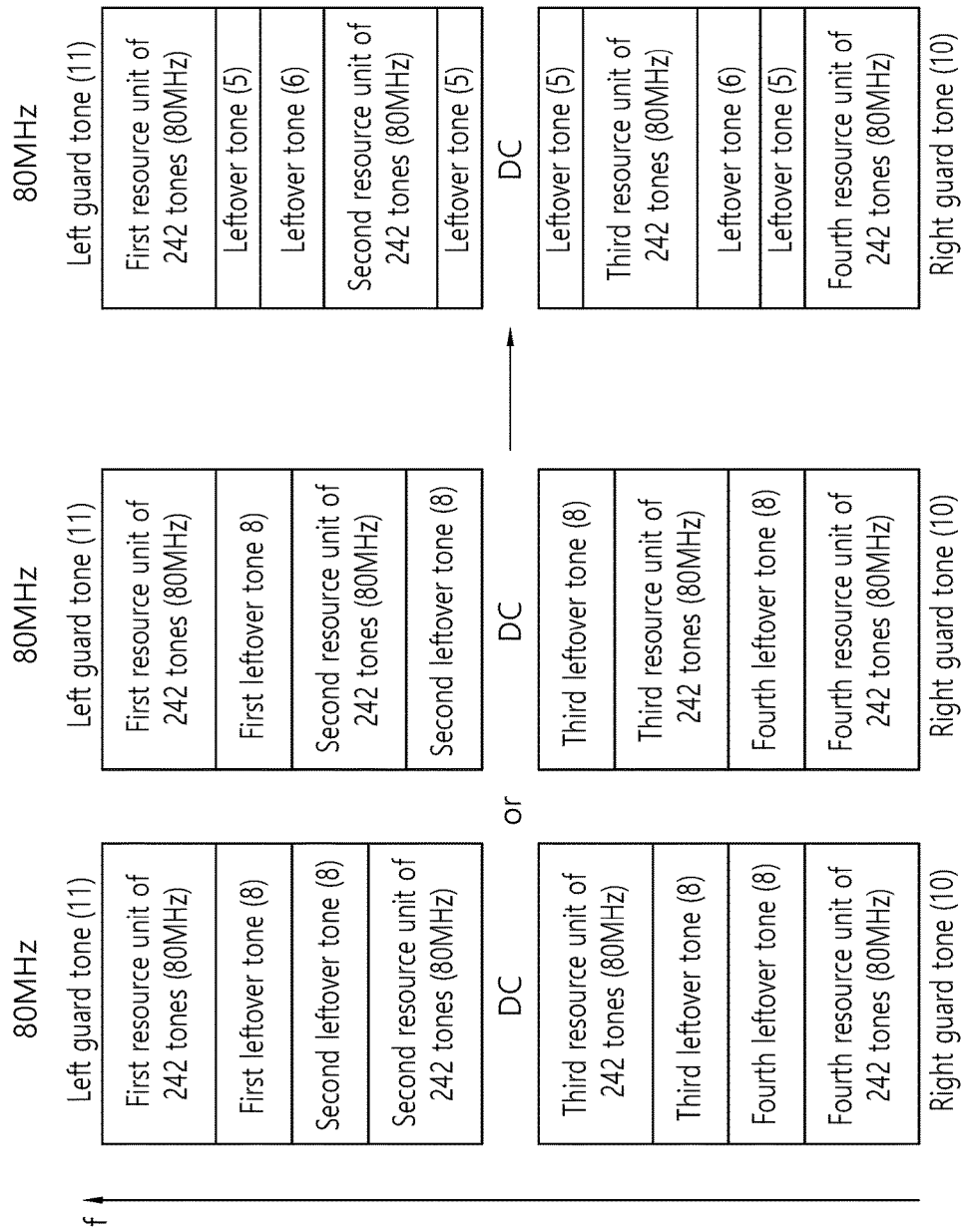
FIG. 6 is a conceptual view illustrating allocation of a left guard tone in accordance with an embodiment of the present invention.

FIG. 6 is a conceptual view illustrating allocation of a left guard tone in accordance with an embodiment of the present invention.

Referring to FIG. 6, the left guard tones of 8 tones is classified into 5 tones and 3 tones, the left guard tones of 3 tones are extracted from each of two left guard tones of 8 tones, and then the left guard tones of 6 tones may be generated with the combination of the left guard tones of 3 tones. The positions of these left guard tones of 6 tones may be allocated to be corresponded to the positions of the left guard tones of 6 tones on the 20 MHz bandwidth, and positions of the left guard tones of the remaining 5 tones (8 tone-3 tones) may be allocated to be corresponded to the positions of the right guard tones of 5 tones on the 20 MHz bandwidth.

In FIGS. 2 to 5, although the DC tone is defined for the 20 MHz bandwidth, the DC tone should be defined for the 20 MHz bandwidth. That is, a certain number of tones should be additionally allocated to the DC tones over the 20 MHz bandwidth.

Figure 7:
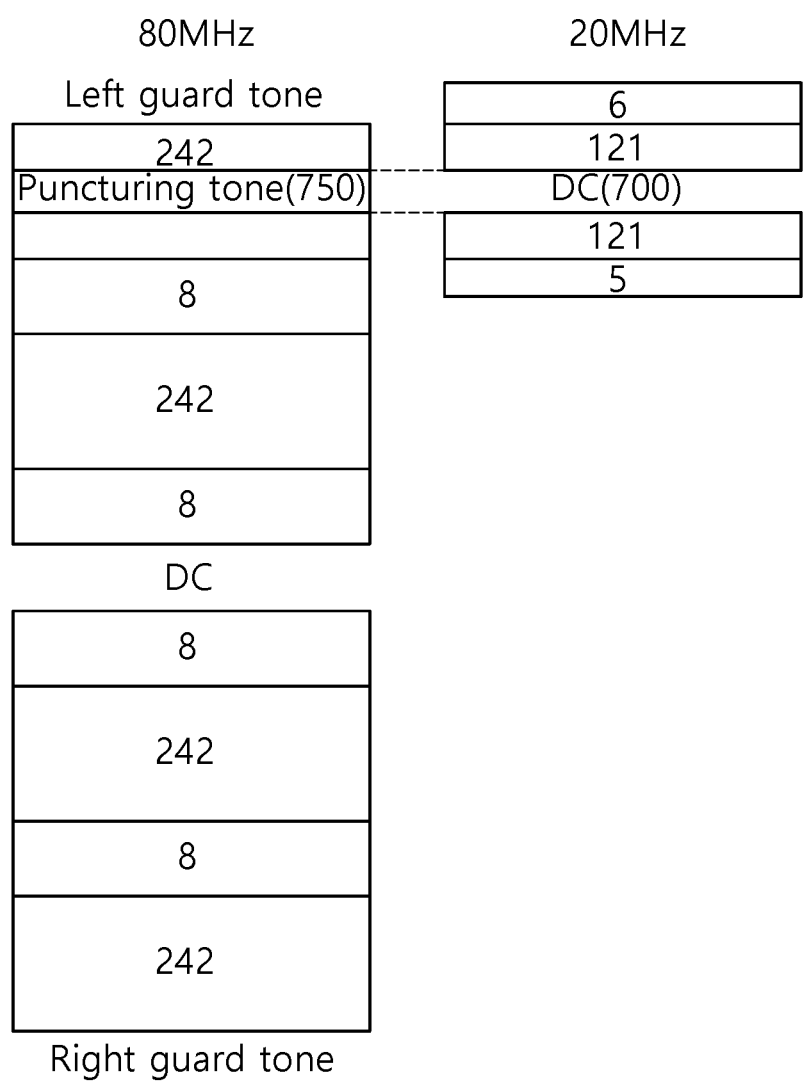
FIG. 7 is a conceptual view illustrating a method for allocating resources on 20 MHz bandwidth in accordance with an embodiment of the present invention.

FIG. 7 is a conceptual view illustrating a method for allocating resources on 20 MHz bandwidth in accordance with an embodiment of the present invention.

In FIG. 7, resource allocation is initiated on the 20 MHz bandwidth considering additional DC tone on the 20 MHz bandwidth.

Referring to FIG. 7, n DC tones 700 may be included as well as the left guard tones/the right guard tones/the resource unit of 242 tones (hereinafter referred to as the resource unit of 242 tones (20 MHz)) on the 20 MHz bandwidth. In this case, at the resource unit of 242 tones allocated on the 80 MHz bandwidth (hereinafter, referred to as the the resource unit of 242 tones (80 MHz)) allocated at a position corresponding to the resource unit of 242 tones allocated on the 20 MHz bandwidth, tones corresponded to the location of n DC tones 700 may be punctured. That is, the position of the DC tone 700 defined on the 20 MHz bandwidth may configure to be the same as the position of the puncturing tone 750 included in the resource unit of 242 tones (80 MHz).

If the number of tones allocated to the DC tone 700 on the 20 MHz bandwidth is 3, then 3 tones corresponding to the location of the centrally located DC tone within the resource unit of 242 tones (80 MHz) may be punctured. Or if the number of tones allocated to the DC tone 700 on the 20 MHz bandwidth is 5, then 5 tones corresponding to the location of the DC tone located centrally within the resource unit of 242 tones (80 MHz) may be punctured.

If the number of DC tones 700 allocated on the 20 MHz bandwidth is not small, the number of tones punctured in the resource unit of 242 tones (80 MHz) will be increased. The increase in the number of punctured tones may result in the loss of wireless resources in the 80 MHz bandwidth.

Hereinafter, disclosed is a method of reducing the loss of wireless resources due to the increase in the number of tones punctured in the present invention.

Figure 8:
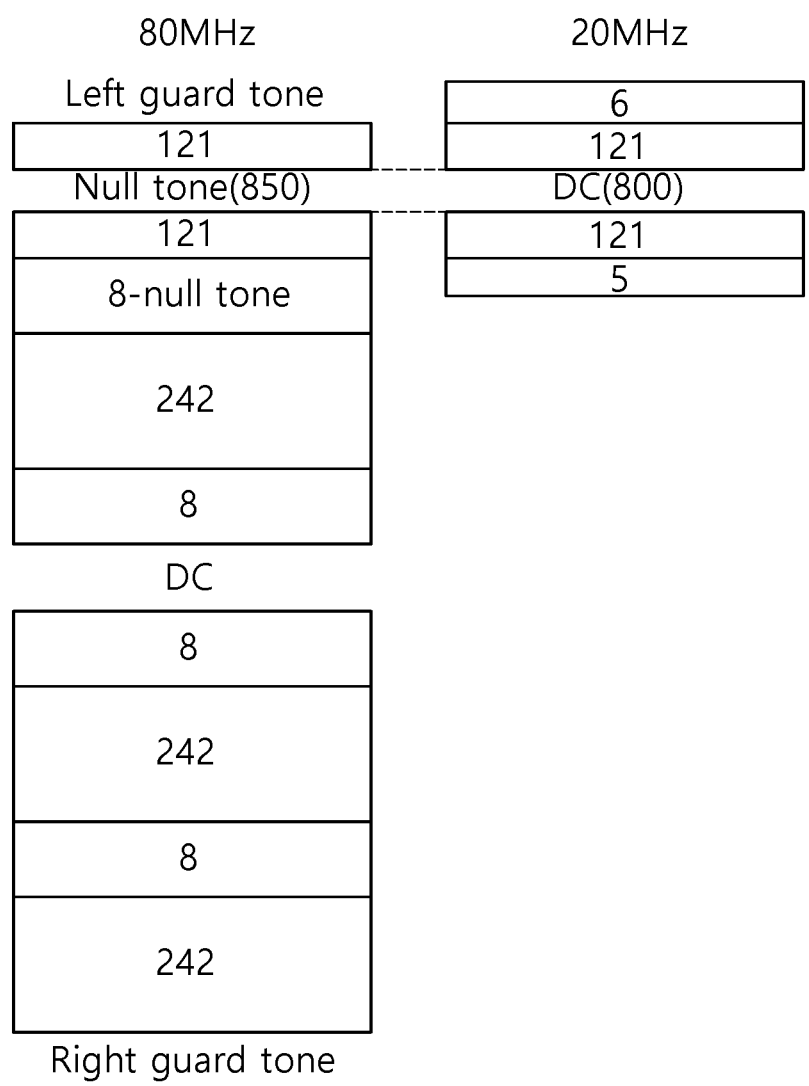
FIG. 8 is a conceptual view illustrating a method for allocating resources on 20 MHz bandwidth in accordance with an embodiment of the present invention.

FIG. 8 is a conceptual view illustrating a method for allocating resources on 20 MHz bandwidth in accordance with an embodiment of the present invention.

In FIG. 8, resource allocation is initiated on the 20 MHz bandwidth with additional consideration of the DC tone on the 20 MHz bandwidth. In particular, disclosed is a method for reducing the loss of wireless resources due to the increase in the number of tones punctured.

A null tone 850 of the number of DC tones 800 may be inserted in the resource unit of 242 tones (80 MHz) corresponding to the DC tone defined on the 20 MHz bandwidth. The null tone 850 refers to all empty subcarriers for which no signal such as data is carried.

In this case, a part of the guard tone allocated on the 80 MHz bandwidth may be used as the null tone 850 and included in the resource unit of 242 tones (80 MHz).

The number and location of null tones included in the resource unit of 242 tones (80 MHz) may be the same as the location and number of DC tones defined in the 20 MHz bandwidth.

This method may be applied to the resource allocation method on the 80 MHz bandwidth and the resource allocation method on the 20 MHz bandwidth disclosed in FIGS. 2 to 5 described above.

Figure 9:
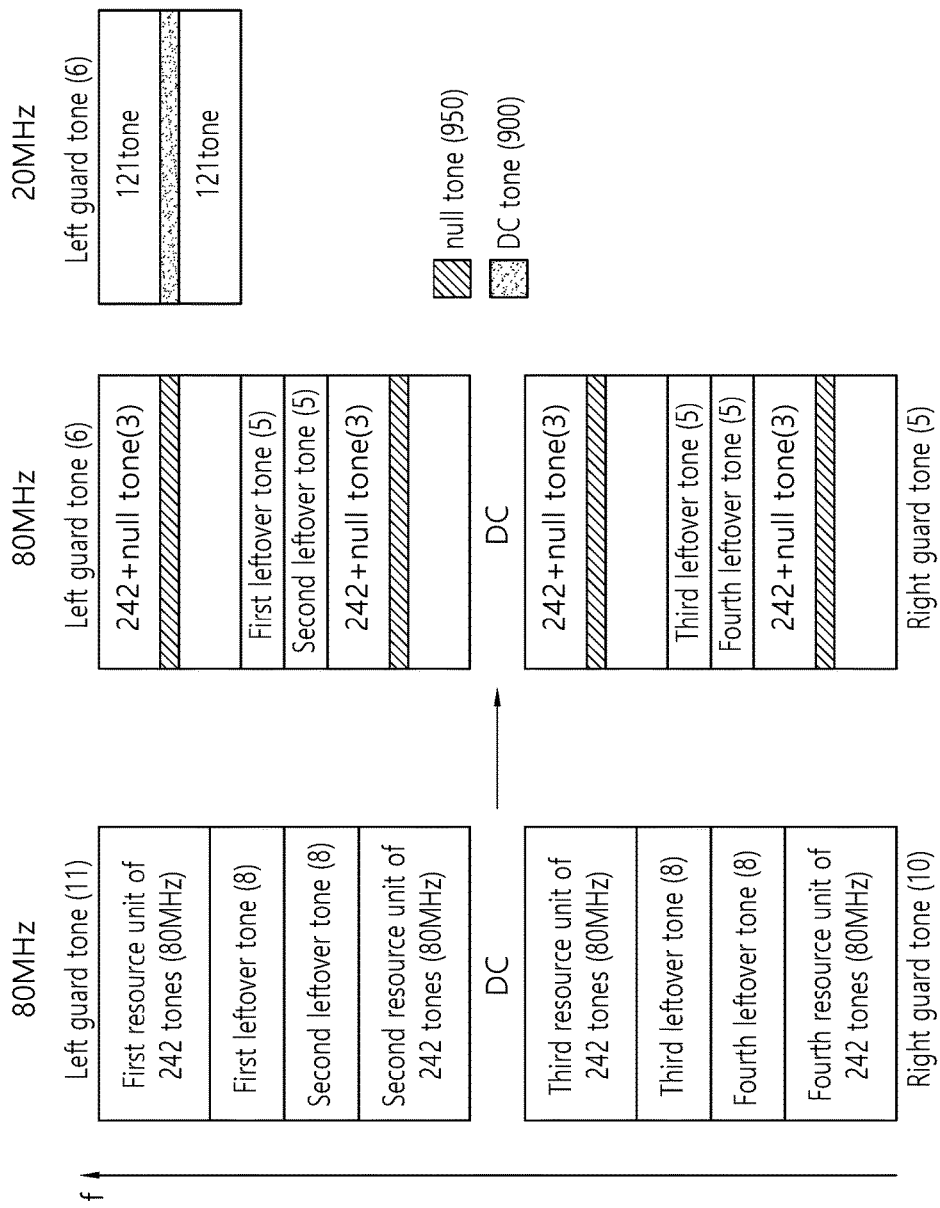
FIG. 9 is a conceptual view illustrating allocation of a DC tone in accordance with an embodiment of the present invention.

FIG. 9 is a conceptual view illustrating allocation of a DC tone in accordance with an embodiment of the present invention.

In FIG. 9 disclosed is a change in the null tone and the corresponding leftover tone included in a plurality of resource unit of 242 tones (80 MHz), in the resource allocation on the 80 MHz bandwidth disclosed on the left side of FIG. 2.

Referring to FIG. 9, the first resource unit of 242 tones (80 MHz) may utilize 3 tones of the first leftover tone of 8 tones as the null tone 950. In this case, the first leftover tone of 8 tones may be reduced to the first leftover ton of 5 tones. The null tone position of three tones included in the first resource unit of 242 tones (80 MHz) may correspond to the position of the DC tone 900 defined on the 20 MHz bandwidth.

The second resource unit of 242 tones (80 MHz) may also utilize 3 tones of the second leftover tone of 8 tones as null tone 950. In this case, the second leftover tone of 8 tones may be reduced to the second leftover tone of 5 tones. The position of the three tone null tone 950 included in the second resource unit of 242 tones (80 MHz) may correspond to the position of the DC tone 900 defined on the 20 MHz bandwidth.

Alternatively, the second resource unit of 242 tones (80 MHz) may utilize 3 tones of the second leftover tone of 8 tones as null tone 950, and the remaining 5 tones of the second leftover ton is classified into, and it may be located in the leftover tone of 2 tones, and the leftover tone of 3 tones, adjacent to the second resource unit of 242 tones. In this case, the second resource unit of 242 tones (80 MHz) may be located in the center of 250 tones.

The null tone 950 may be allocated to the remaining third resource unit of 242 tones (80 MHz), the fourth resource unit of 242 tones (80 MHz), similarly to the first resource unit of 242 tones (80 MHz) and the second resource unit of 242 tones (80 MHz).

When the allocation of the null tone 950 is performed as above, the number of existing data tones allocated to the resource unit of 242 tones (80 MHz) is not decreased and the null tone 950 is added. Thus, there may be no reduction in wireless resource utilization efficiency due to the addition of the null tone 950.

Further, according to the embodiment of the present invention, when a gap among resource unit of 242 tones (80 MHz) is reduced due to utilization of the above leftover tones as null tones 950, some of the 13 tones corresponding to the guard tones (or gap tones) of the tones, and the DC tones located in the center of the 800 MHz bandwidth, may be used as the null tones 950 included in the resource unit of 242 tones (80 MHz).

Figure 10:
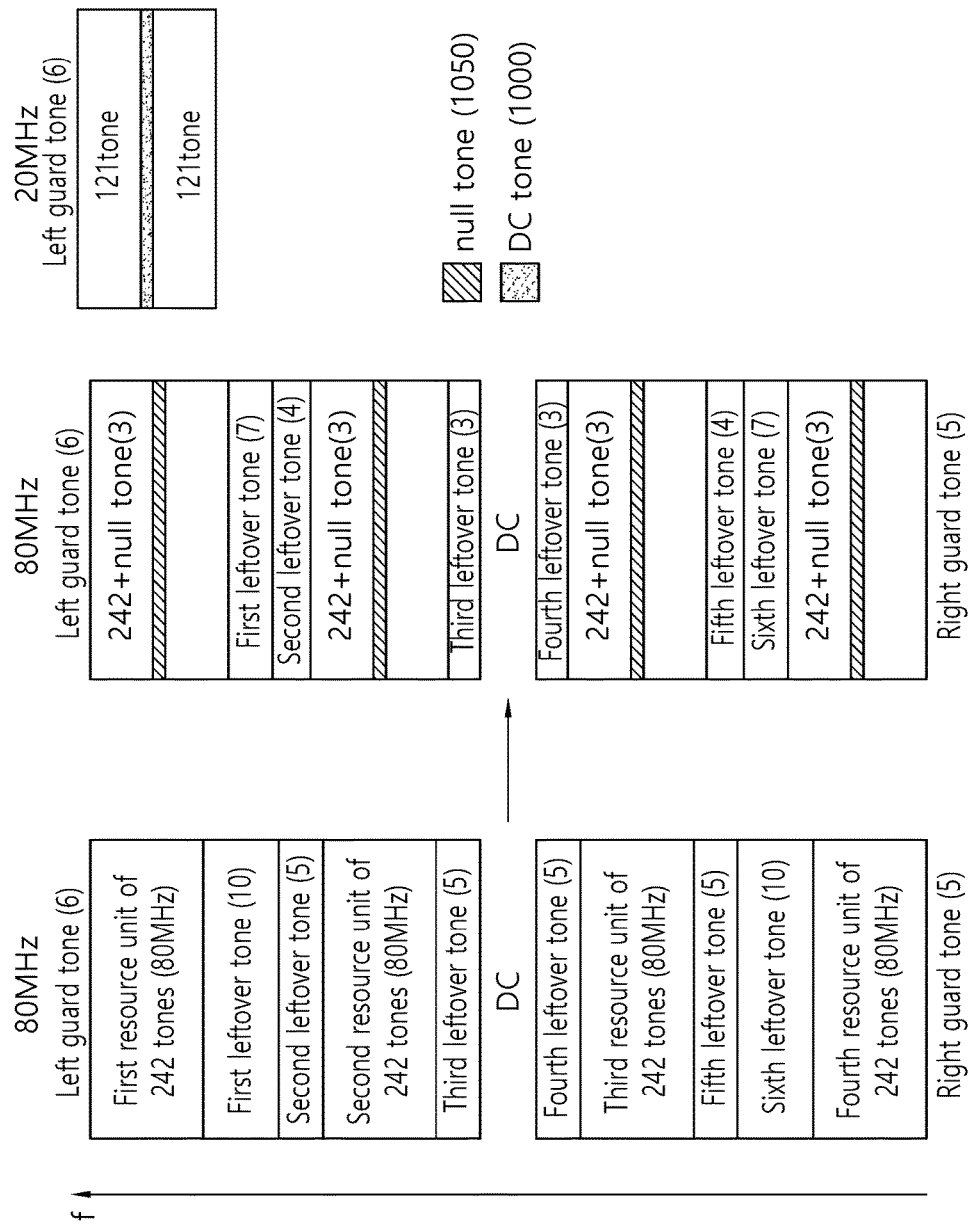
FIG. 10 is a conceptual view illustrating allocation of a DC tone in accordance with an embodiment of the present invention.

FIG. 10 is a conceptual view illustrating allocation of a DC tone in accordance with an embodiment of the present invention.

In FIG. 10, a case where the 80 MHz bandwidth includes four 252 tones, and the resource unit of 242 tones and the leftover tones of ten tones are allocated on each of four 252 tones.

Referring to FIG. 7, the first resource unit of 242 tones (80 MHz) may utilize three tones of the first leftover tones of 10 tones as the null tones. In this case, the first leftover tone of 10 tones may be reduced to the first leftover tone of 7 tones. The location of the three null tones 1050 included in the first resource unit of 242 tones (80 MHz) may correspond to the location of the DC tone 1000 defined on the 20 MHz bandwidth.

In the second resource unit of 242 tones (80 MHz), one tone of the second leftover tone of 5 tones may be utilized as the null tone 1050, and 2 tones of the third leftover ton of 5 tones may be utilized as the null tone 1050. That is, three tones may be determined as the null tones 1050 in the second leftover tone of 5 tones and the third leftover tone of 5 tones. In this case, the second leftover tone of 5 tones may be reduced to the second leftover tone of 4 tones, and the third leftover tone of 5 tones may be reduced to the third leftover tone of 3 tones.

The location of the null tones of three tones 1050 included in the second resource unit of 242 tones (80 MHz) may correspond to the location of the DC tone 1000 defined on the 20 MHz bandwidth.

The null tone 1050 may be allocated to the remaining third resource unit of 242 tones s (80 MHz), the fourth resource unit of 242 tones (80 MHz), similarly to the first resource unit of 242 tones (80 MHz) and the second resource unit of 242 tones.

When the above allocation of the null tone 1050 is performed, the number of existing data tones allocated to the resource unit of 242 tones (80 MHz) is not reduced but the null tone is added. Thus, there may be no reduction in wireless resource utilization efficiency due to the addition of null tones.

In the above-described present invention, although the tone reduction for a STA with the 20 MHz front-end bandwidth considering resource allocation on the 80 MHz bandwidth has been disclosed, the tone numerology for a STA with the 40 MHz front-end bandwidth may be determined in the same manner, considering the resource allocation on the 80 MHz bandwidth.

Figure 11:
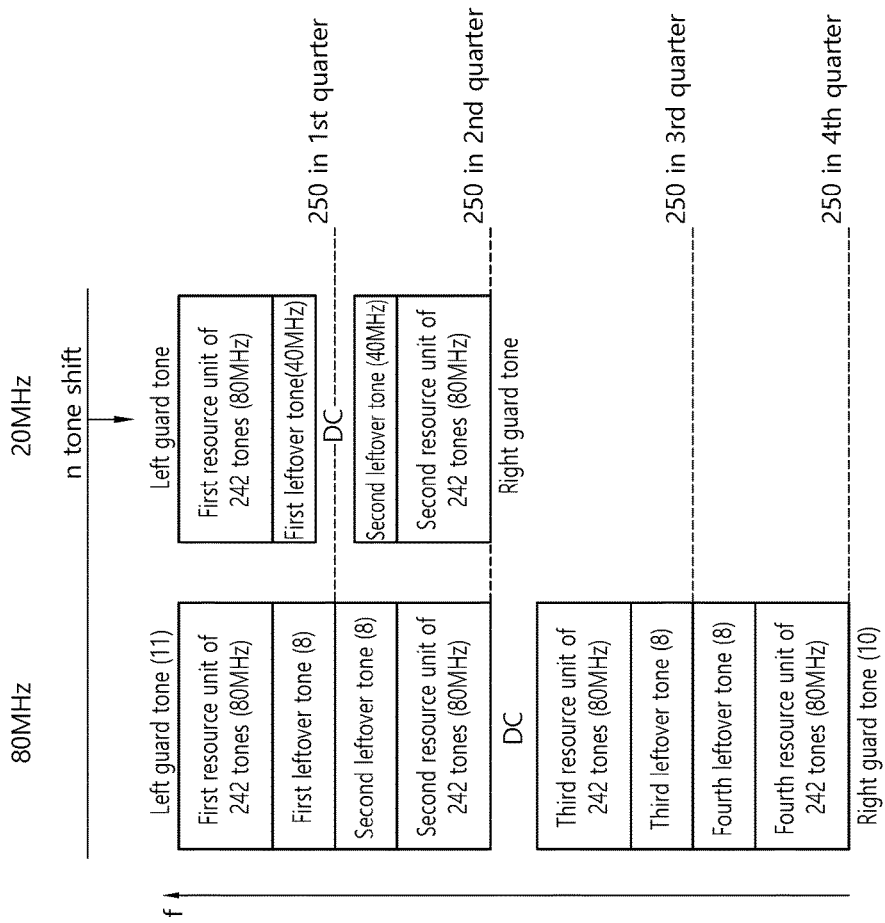
FIG. 11 is a conceptual view illustrating a method for allocating resources on 40 MHz bandwidth in accordance with an embodiment of the present invention.

FIG. 11 is a conceptual view illustrating a method for allocating resources on 40 MHz bandwidth in accordance with an embodiment of the present invention.

In FIG. 11, disclosed is the tone neural numerology for a STA having the 40 MHz front-end bandwidth, considering resource allocation on the 80 MHz bandwidth disclosed on the left side of FIG. 2.

Referring to FIG. 11, a resource allocation for a STA with the 40 MHz front-end bandwidth may be performed based on the left guard tone, a first resource unit of 242 tones (40 MHz), a first leftover tone (40 MHz), the DC tone, (40 MHz), a second resource unit of 242 tones (40 MHz), and the right guard tone.

For example, the allocation position of the first resource unit of 242 tones (80 MHz) adjacent to the left guard tone of 11 tones allocated on the 80 MHz bandwidth may be configured to be same as the allocation position of the first resource unit of 242 tones (40 MHz) allocated on the 40 MHz bandwidth are the same. In addition, the allocation position of the second resource unit of 242 tones (80 MHz) may be configured to be same as the allocation position of the second resource unit of 242 tones (40 MHz) allocated on the 40 MHz bandwidth. Shifting for the allocation start point of the left guard tone may be performed for configuring the allocation position on the above 40 MHz bandwidth.

The sum of the first leftover tone, the DC tone, and the second leftover tone may be configured to be 16 tones for adjusting the above position configuration, and the remaining tones (512 tones−(484 tones+16 tones)=12 tones) may be configured to be the left guard tone and the right guard tone.

Figure 12:
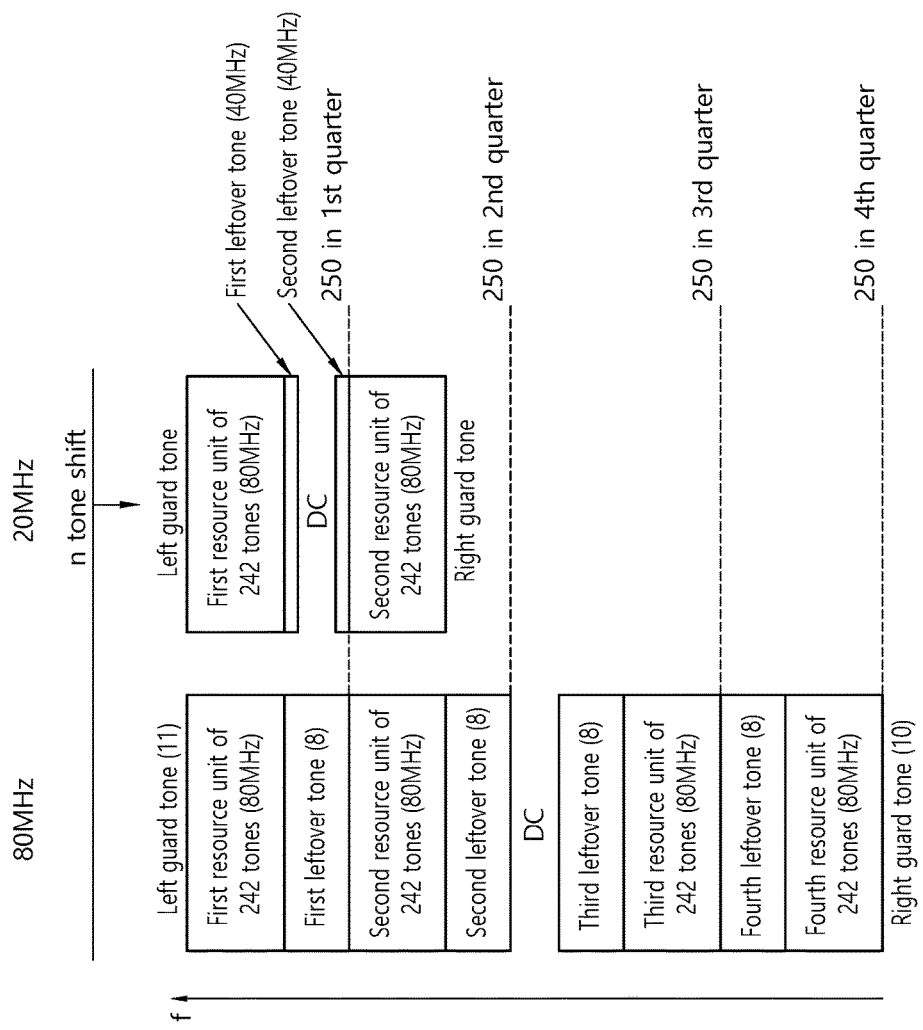
FIG. 12 is a conceptual view illustrating a method for allocating resources on 40 MHz bandwidth in accordance with an embodiment of the present invention.

FIG. 12 is a conceptual view illustrating a method for allocating resources on 40 MHz bandwidth in accordance with an embodiment of the present invention.

In FIG. 12, 2 disclosed is the tone numerology for STAs with the 40 MHz front-end bandwidth considering resource allocation on the 80 MHz bandwidth disclosed in the middle part of FIG. 2.

Referring to FIG. 12, a resource allocation for a STA with the 40 MHz front-end bandwidth may be performed based on the left guard tone, a first resource unit of 242 tones (40 MHz), a first leftover tone, the DC tone, a second leftover tone, a second resource unit of 242 tones (40 MHz) and the right guard tone.

For example, the allocation position of the first resource unit of 242 tones (80 MHz) adjacent to the left guard tone of 11 tones allocated on the 80 MHz bandwidth may be configured to be the same as the allocation position of the first resource unit of 242 tones (40 MHz) allocated on the 40 MHz bandwidth. In addition, the allocation position of the second resource unit of 242 tones (80 MHz) may be configure to be the same as the allocation position of the second resource unit of 242 tones (40 MHz) allocated on the 40 MHz bandwidth. Shifting for the allocation start point of the left guard tone may be performed for configuring the allocation position on the above 40 MHz bandwidth.

The sum of the first leftover tones, the DC tones and the second leftover tones may be configure to be 8 tones for adjusting the above position configuration, and the remaining tones (512 tones−(484 tones+8 tones)=20 tones) may be configure to be the left guard tone and the right guard tone.

Or, the first leftover tone and the second leftover tone are not defined, and the DC tone may be configured to be 8 tones.

Figure 13:
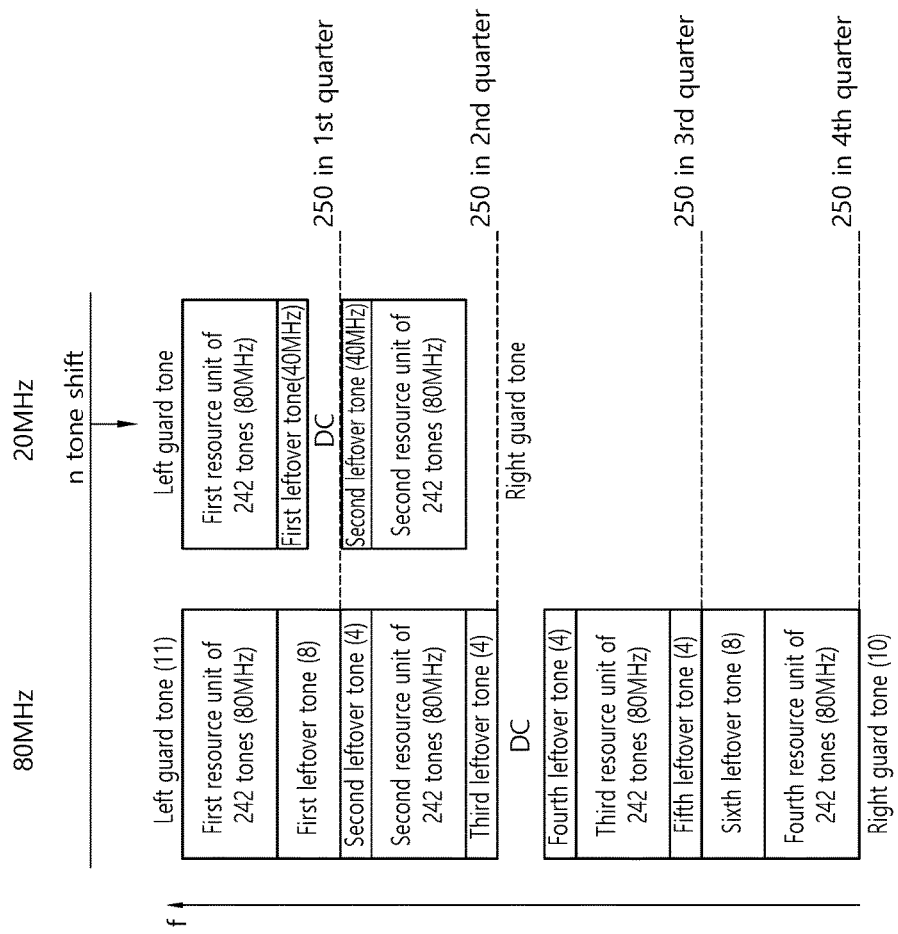
FIG. 13 is a conceptual view illustrating a method for allocating resources on 40 MHz bandwidth in accordance with an embodiment of the present invention.

FIG. 13 is a conceptual view illustrating a method for allocating resources on 40 MHz bandwidth in accordance with an embodiment of the present invention.

In to FIG. 13, disclosed is the tone numerology for a STA with the 40 MHz front-end bandwidth considering the resource allocation on the 80 MHz bandwidth disclosed on the right side of FIG. 2.

Referring to FIG. 10, the resource allocation for the STA with the 40 MHz front-end bandwidth may be performed based on the left guard tone, a first resource unit of 242 tones (40 MHz), a first leftover ton, the DC tone, a second resource unit of 242 tones (40 MHz) and the right guard tone.

For example, the allocation position of the first resource unit of 242 tones (80 MHz) adjacent to the left guard tone of 11 tones allocated on the 80 MHz bandwidth may be configured to be the same as the allocation position of the first resource unit of 242 tones (40 MHz) allocated on the 40 MHz bandwidth. In addition, the allocation position of the second resource unit of 242 tones (80 MHz) may be configure to be the same as the allocation position of the second resource unit of 242 tones (40 MHz) allocated on the 40 MHz bandwidth. Shifting for the allocation start point of the left guard tone may be performed for configuring the allocation position on the above 40 MHz bandwidth.

The sum of the first leftover tones, the DC tones, and the second leftover tones may be configure to be 12 tones for adjusting the above position configuration, and the remaining tones (512 tones−(484 tones+12 tones)=16 tones) may be configure to the left guard tone and the right guard tone.

In FIGS. 11 to 13, although allocation of the first 242 resource unit (40 MHz) and the second 242 resource unit (40 MHz) corresponding to the third 242 resource unit (80 MHz) and the fourth 242 resource unit (80 MHz) is not disclosed, it may be allocated in the same manner as an allocation method on the first 242 resource unit (40 MHz) and the second 242 resource unit (40 MHz) allocated in correspondence with the first 242 resource unit (80 MHz) and the second 242 resource unit (80 MHz) is.

Figure 14:
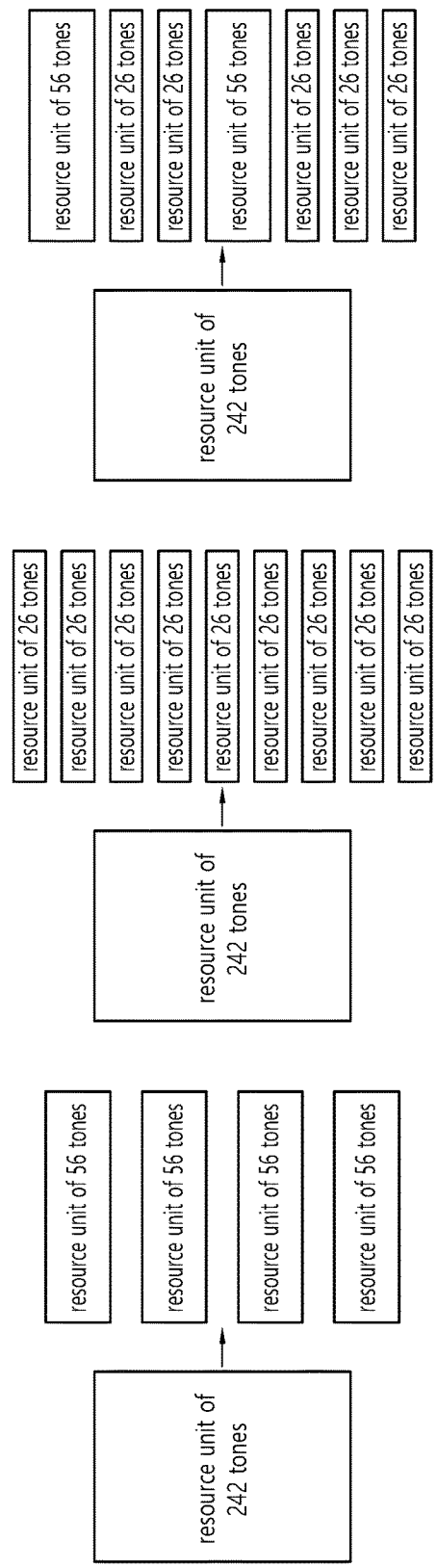
FIG. 14 is a conceptual view illustrating division of a resource unit of 242 tones in accordance with an embodiment of the present invention.

FIG. 14 is a conceptual view illustrating division of a resource unit of 242 tones in accordance with an embodiment of the present invention.

In FIG. 14, a method is disclosed in which a resource unit of 242 tones is classified into smaller resource unit (the resource unit of 56 tones, the resource unit of 26 tones).

Referring to FIG. 14, according to an embodiment of the present invention, the resource unit of 242 tones may be used by being classified into a combination of resource unit of relatively small sizes. For example, the resource unit of 242 tones may be configured based on at least one 56 tone resource unit and/or at least one 26 tone resource unit.

Referring to the left side of FIG. 14, four resource units of 56 tones (56 tones*4=224 tones) may be used instead of the resource unit of 242 tones. In this case, a sufficient number of leftover tones may be included within the 242 tones. Therefore, the leftover tones may be used as guard tones.

Referring to the middle part of FIG. 14, nine resource units of 26 tones (26 tone * 9 =234 tone) may be used instead of the resource unit of 242 tones. In this case, the leftover tone of 8 tones may be included in the resource unit of 242 tones, and the leftover tones of 8 tones may be used as the guard tones for 9 resource units of 26 tones.

Referring to the right side of FIG. 14, two resource units of 56 tones and five resources of 26 tones unit may be used instead of resource unit of 242 tones s. In such a case, a sufficient number of leftover tones may be guaranteed, without using some resource unit (e.g., 26 tone resource unit or 13 tone resource unit which divides 26 tones into halves).

Or, the resource unit of 56 tones may be constituted as two resource units of 26 tones and the leftover tone by changing a configuration of the resource unit of 56 tones and or it may be constituted by combining two resource units of 26 tones and leftover tones.

In this case, four resource units of 56 tones and one 26 tone resource unit are used, instead of two resource units of 56 tones and five resource units of 26 tones, or three resource units of 56 tones and three resource units of 26 tones may be used.

Figure 15:
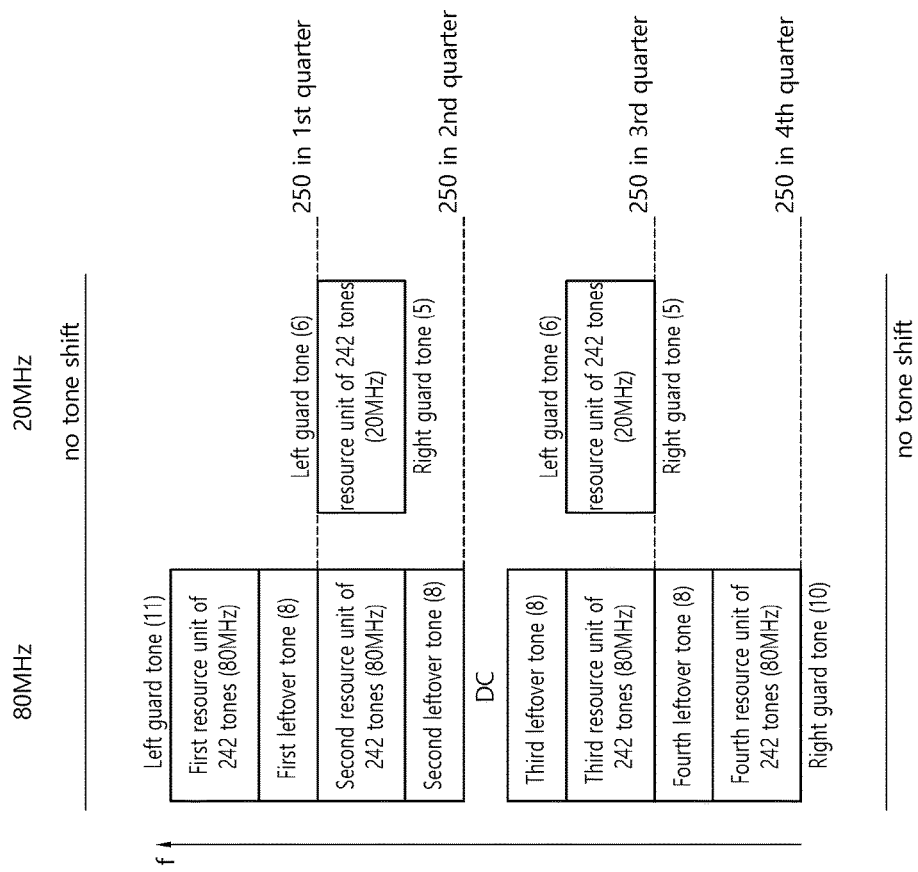
FIG. 15 is a conceptual view illustrating a method for allocating resources on 20 MHz bandwidth in accordance with an embodiment of the present invention.

FIG. 15 is a conceptual view illustrating a method for allocating resources on 20 MHz bandwidth in accordance with an embodiment of the present invention.

In FIG. 15, when shifting for bandwidth is impossible, a method of allocating resources on the 20 MHz bandwidth is disclosed. According to an embodiment of the invention, shifting for bandwidth may be impossible when performing resource allocation for the 20 MHz bandwidth (or when performing resource allocation for STAs supporting the 20 MHz front-end). This is because, if shifting for bandwidth is performed, the bandwidth may be operated with low efficiency because the resource block is shifted in mode.

Therefore, when shifting on the bandwidth is impossible, the following resource allocation may be performed.

The left guard tone (or left-most guard tone) and the right guard tone (or the right-most guard tone) in the 80 MHz bandwidth may be configured to be 11 and 10 tones, respectively. Further, in the 80 MH bandwidth, the left guard tone, a first resource unit of 242 tones (80 MHz), a first leftover ton, a second resource unit of 242 tones (80 MHz), a second leftover tone, the DC tone, a third resource unit of 242 tones (80 MHz), a fourth leftover tone, a fourth resource unit of 242 tones (80 MHz), and the right guard tone may be allocated.

The left guard tones (6 tones), the resource unit of 242 tones (20 MHz)+the DC tones, and right guard tones (5 tones) may be allocated on the 20 MHz bandwidth.

In this case, the resource unit of 242 tones (20 MHz) allocated to the 20 MHz bandwidth may be allocated to correspond to the second resource unit of 242 tones (80 MHz) or the third resource unit of 242 tones (80 MHz) adjacent to the DC tone. In other words, the first resource unit of 242 tones (80 MHz) and the fourth resource unit of 242 tones (80 MHz) adjacent to an edge of the 80 MHz bandwidth may not correspond to the resource unit of 242 tones (20 MHz).

In this case, the positions of the second resource unit of 242 tones (80 MHz) and the third resource unit of 242 tones (80 MHz) may be adjusted based on the allocation of the leftover tones and may be configured to be corresponded to the resource unit of 242 tones (20 MHz).

Figure 16:
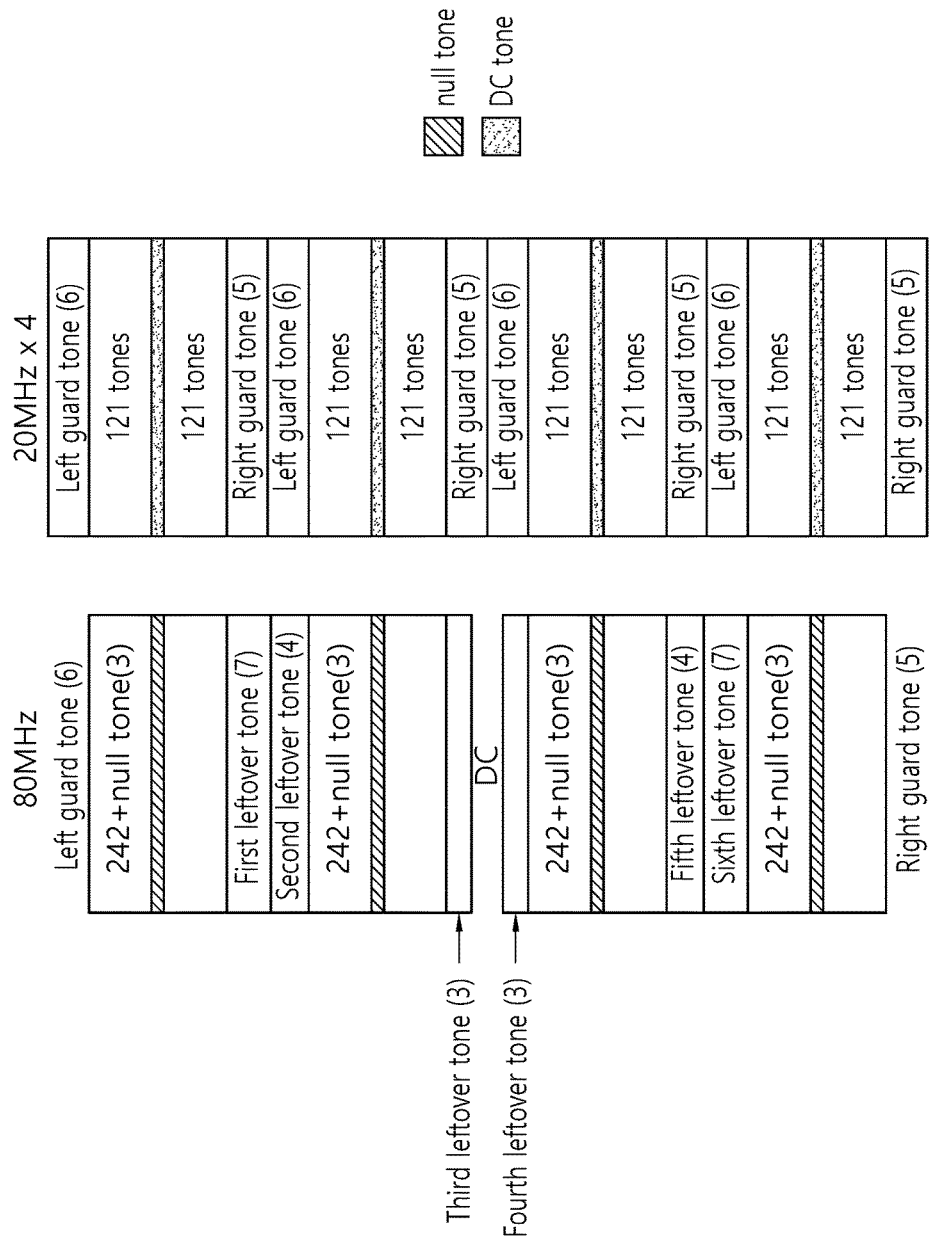
FIG. 16 is a conceptual view illustrating a method for allocating resources on 20 MHz bandwidth in accordance with an embodiment of the present invention.

FIG. 16 is a conceptual view illustrating a method for allocating resources on 20 MHz bandwidth in accordance with an embodiment of the present invention.

Also in FIG. 16, disclosed is a method of allocating resources on the 20 MHz bandwidth when shifting for bandwidth is impossible. In FIG. 16, disclosed is a method of allocating resources on the 20 MHz bandwidth, without shifting for the 20 MHz bandwidth based on adjusting the number of left guard tones/right guard tones defined in the 80 MHz bandwidth.

In the 80 MHz bandwidth, the left guard tones may be configured to be 6 and the right guard tones may be configured to be 5. Further, the left guard tone, the first resource unit of 242 tones (80 MHz), the second resource unit of 242 tones (80 MHz), the DC tone, the third resource unit of 242 tones (80 MHz), the fourth resource unit of 242 tones (80 MHz) (80 MHz) and the right guard tone may be allocated in the 80 MH bandwidth.

The left guard tones (6 tones), the resource unit of 242 tones (20 MHz) +the DC tones, and the right guard tones (5 tones) may be allocated on the 20 MHz bandwidth.

In this case, the resource unit of 242 tones (20 MHz) may be corresponded to the first resource unit of 242 tones (80 MHz), the second resource unit of 242 tones (80 MHz), the third resource unit of 242 tones (80 MHz), and the fourth resource unit of 242 tones (80 MHz). That is, the resource unit of 242 tones (20 MHz) may be corresponded to any resource unit of 242 tones (80 MHz) among four resource units of 242 tones (80 MHz) included in the 80 MHz bandwidth.

Figure 17:
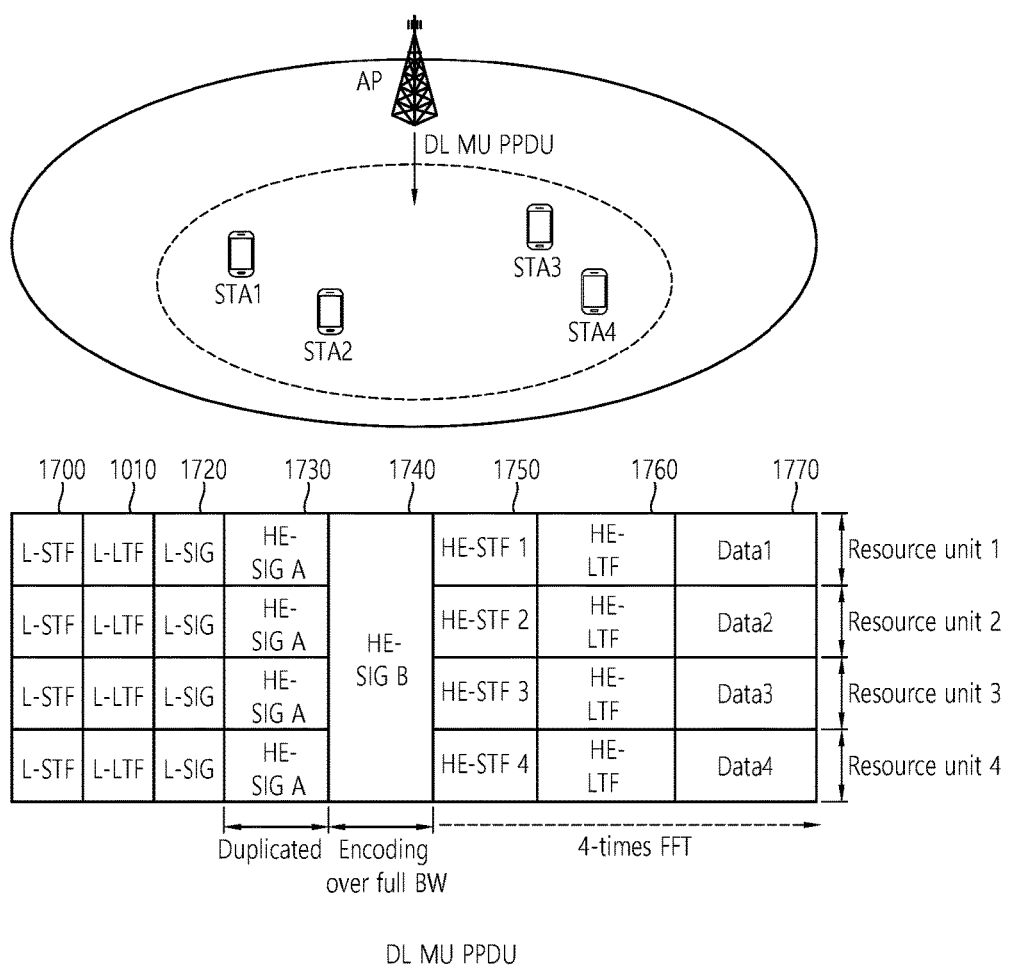
FIG. 17 is a conceptual view illustrating a format of DL MU PPDU in accordance with an embodiment of the present invention.

FIG. 17 is a conceptual view illustrating a format of DL MU PPDU in accordance with an embodiment of the present invention.

In FIG. 17, a DL MU PPDU format transmitted based on OFDMA by an AP according to an embodiment of the present invention is disclosed.

Referring to FIG. 17, a PPDU header of the DL MU PPDU includes a legacy-short training field (L-STF), a legacy-long training field (L-LTF), a legacy-signal (L-SIG) a high efficiency-signal A (HE-SIG A), a high efficiency-signal-B (HE-SIG B), a high efficiency-short training field (HE-STF), a high efficiency-long training field (HE-LTF), a data field (or MAC payload). From the PHY header to the L-SIG, it may be divided into a legacy part and a high efficiency (HE) part (HE part) after L-SIG.

The L-STF 1700 may include a short training orthogonal frequency division multiplexing symbol (OFDM symbol). The L-STF 1700 may be used for frame detection, automatic gain control (AGC), diversity detection, and coarse frequency/time synchronization.

The L-LTF 1710 may comprise a long training orthogonal frequency division multiplexing symbol (OFDM symbol). The L-LTF 1710 may be used for fine frequency/time synchronization and channel estimation.

The L-SIG 1720 may be used to transmit control information. The L-SIG 1720 may include information on a data rate and a data length.

The HE-SIG A 1730 may include information for indicating the STA to receive the DL MU PPDU. For example, HE-SIG A 1730 may include an identifier of a particular STA (or AP) to receive a PPDU, and information to indicate a particular STA group. Further, the HE-SIG A 1730 may also include resource allocation information for reception of the DL MU PPDU of the STA when the DL MU PPDU is transmitted based on OFDMA or MIMO.

Further, the HE-SIG A 1730 also receives color bits information for the BSS identification information, bandwidth information, tail bits, CRC bits, and modulation and coding scheme (MCS) information for the HE-SIG B 1740, symbol number information for HE-SIG B 1740, and cyclic prefix (CP) (or guard interval) length information.

The HE-SIG B 1740 may include information on the MCS length of a physical layer service data unit (PSDU), tail bits, and the like for each STA. Also, the HE-SIG B 1740 may include information on the STA to receive the PPDU, resource allocation information based on OFDMA (or MU-MIMO information). When the OFDMA-based resource allocation information (or MU-MIMO related information) is included in the HE-SIG B 1740, the HE-SIG A 1730 may not include the resource allocation information.

The HE-SIG A 1750 or the HE-SIG B 1760 may include resource allocation information (or virtual resource allocation information) for each of a plurality of STAs. For example, resource scheduling information based on BTU/STU may be included in HE-SIG A 1750 or HE-SIG B 1760.

The field prior to HE-SIG B 1740 on the DL MU PPDU may be transmitted on each of the different transmission resources in the duplicated form. In the case of HE-SIG B 1740, HE-SIG B 1740 transmitted in some resource unit (e.g., resource unit 1, resource unit 2) is an independent field containing individual information, the HE-SIG B 1740 transmitted from the remaining resource unit (e.g., resource unit 3, resource unit 4) may be the duplicate format on the HE-SIG B 1740 transmitted from another resource unit (e.g., resource unit 1, resource unit 2). Or HE-SIG B 1740 may be transmitted in encoded form over the entire transmission resource. The field subsequent to HE-SIG B 1740 may include individual information for each of a plurality of STAs receiving a PPDU.

The HE-STF 1750 may be used to improve automatic gain control (AGC) estimation in a multiple input multiple output (MIMO) environment or an OFDMA environment.

Specifically, the STA1 receives the HE-STF1 transmitted through the resource unit 1 from the AP, and may decode the data field 1 by performing synchronization, channel tracking/estimation, and AGC to. Similarly, the STA2 may receive the HE-STF2 transmitted through the resource unit 2 from the AP, and may decode the data field 2 by performing synchronization, channel tracking/estimation, and AGC. The STA3 receives the HE-STF3 transmitted through the resource unit 3 from the AP, and may decode the data field 3 by performing synchronization, channel tracking/estimation, and AGC. The STA 4 receives the HE-STF 4 transmitted through the resource unit 4 from the AP, and may decode the data field 4 by performing synchronization, channel tracking/estimation, and AGC.

The HE-LTF 1760 may be used to estimate a channel in a MIMO environment or an OFDMA environment.

The size of the IFFT applied to the fields subsequent to the HE-STF 1750 and the HE-STF 1750 may be different from the size of the IFFT applied to the field prior to the HE-STF 1750. For example, the size of the IFFT applied to the fields subsequent to the HE-STF 1750 and the HE-STF 1750 may be four times larger than the size of the IFFT applied to the field prior to the HE-STF 1750. The STA may receive HE-SIG A 1730 and be instructed to receive a downlink PPDU based on the HE-SIG A 1730. In this case, the STA may perform decoding based on the changed FFT size from the fields subsequent to the HE-STF 1750 and the HE-STF 1750. Conversely, if the STA is not instructed to receive the downlink PPDU based on the HE-SIG A 1730, the STA may stop the decoding and configure the NAV (network allocation vector). The cyclic prefix (CP) of the HE-STF 1750 may have a size larger than the CP of the other fields. During this CP interval, the STA may perform decoding on the downlink PPDU by changing the FFT size.

An access point (AP) may allocate each of a plurality of wireless resources for each of a plurality of STAs on the entire bandwidth and transmit a physical protocol data unit (PPDU) through each of the plurality of STAs to each of the plurality of STAs. Information on allocation of each of a plurality of wireless resources for each of a plurality of STAs may be included in the HE-SIG A 1750 or HE-SIG B 1760 as described above.

In this case, each of the plurality of wireless resources may be a combination of a plurality of wireless resource unit (BTU, STU) defined in different sizes on the frequency axis.

As described above, the resource allocation combination may be a combination of at least one resource unit that may be allocated on the entire available tone according to the size of the bandwidth.

Figure 18:
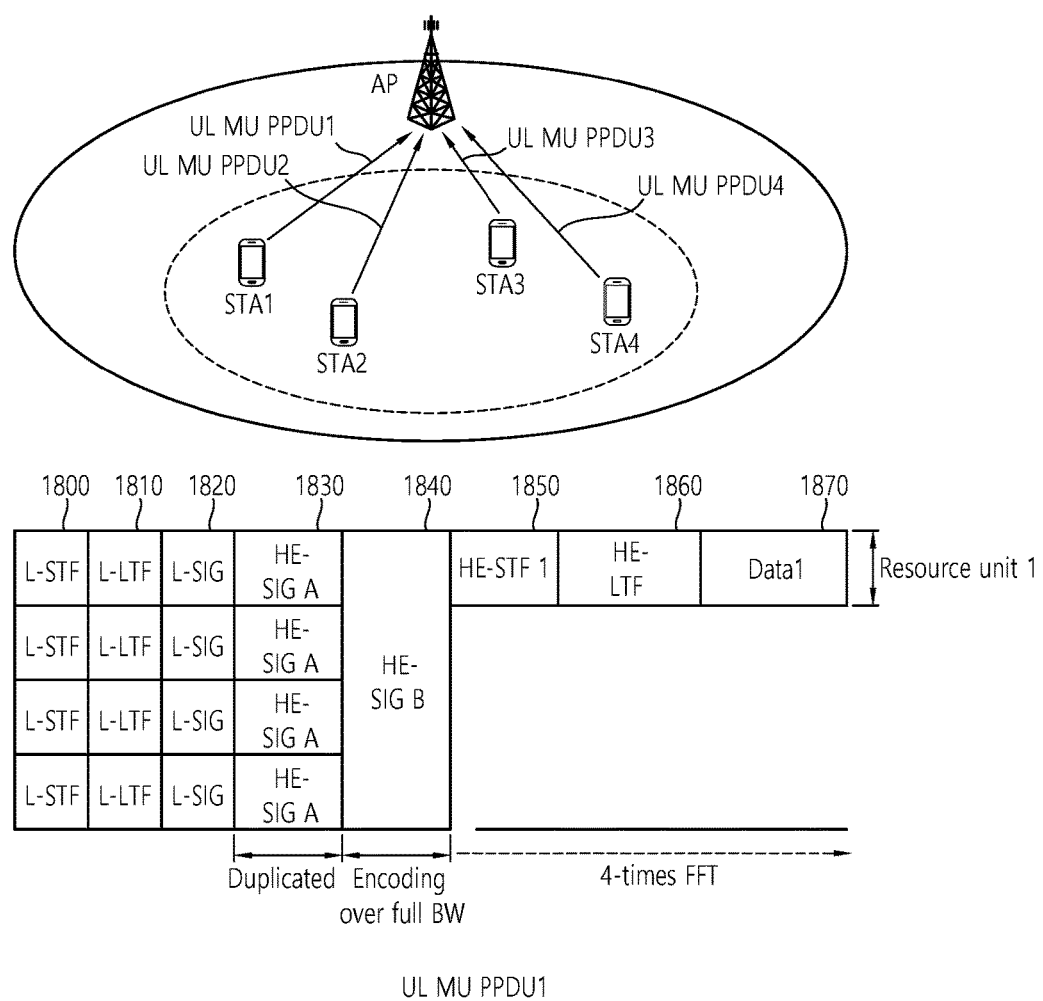
FIG. 18 is a conceptual view illustrating transmission of UL MU PPDU in accordance with an embodiment of the present invention.

FIG. 18 is a conceptual view illustrating transmission of UL MU PPDU in accordance with an embodiment of the present invention.

Referring to FIG. 18, a plurality of STAs may transmit an UL MU PPDU to an AP based on UL MU OFDMA.

The L-STF 1800, L-LTF 1810, L-SIG 1820, HE-SIG A 1830 and HE-SIG B 1840 may perform the functions described in FIG. 8. Information included in the signal field (L-SIG 1820, HE-SIG A 1830, HE-SIG B 1840) may be generated based on information included in the signal field of the received DL MU PPDU.

A STA11 performs uplink transmission through the entire bandwidth until HE-SIG B 1840 and uplink transmission through allocated bandwidth after the HE-STF 1150. The STAT may transmit the UL frame through the allocated bandwidth (e.g., resource unit 1) based on the UL MU PPDU. The AP may allocate uplink resources of each of a plurality of STAs based on a DL MU PPDU (e.g., HE-SIG A/B), each of the plurality of STAs are allocated uplink resources and may transmits UL MU PPDU.

Figure 19:
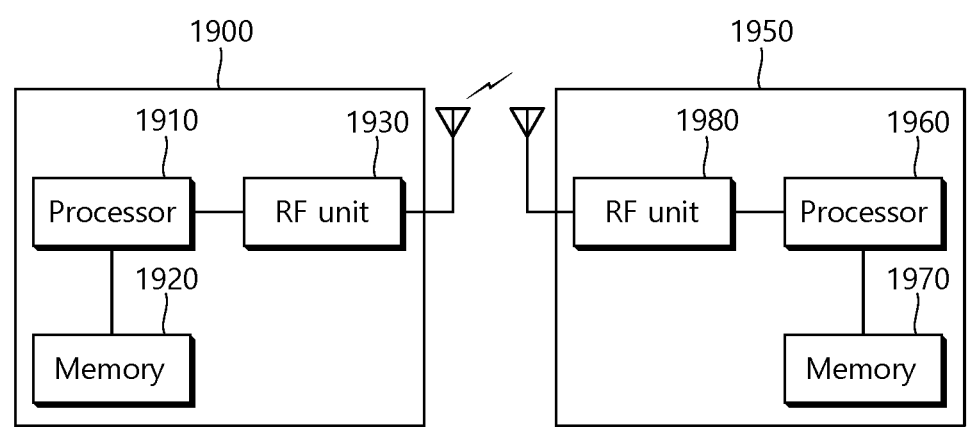
FIG. 19 is a block diagram illustrating a wireless device to which an embodiment of the present invention is applicable.

FIG. 19 is a block diagram illustrating a wireless device to which an embodiment of the present invention is applicable.

Referring to FIG. 19, a wireless device may be an AP 1900 or a non-AP STA (or STA) 1950, which is an STA capable of implementing the embodiments described above.

The AP 1900 comprises a processor 1910, a memory 1920, and a radio frequency (RF) unit 1930.

The RF unit 1930 may be coupled to the processor 1910 and may transmit/receive wireless signals.

The Processor 1910 may implement the functions, processes, and/or methods proposed in the present invention. For example, the processor 1910 may be implemented to perform operations of the AP according to the embodiments of the present invention described above. The processor may perform the operations of the APs disclosed in the embodiments of FIGS. 1 to 18.

For example, the processor 1910 may be configured to determine a first resource unit to be allocated for the STA (station) in the first bandwidth, and to schedule the first resource unit for the STA. The allocation start position of the first resource unit allocated on the first bandwidth may be configure to be the same as the allocation start position of the second resource unit allocated on the second bandwidth and the allocation start position of the first guard tone adjacent to the first resource unit may be configured to be different from the allocation start position of the second guard tone adjacent to the second resource unit based on tone shifting. In this case, the size of the first bandwidth is 20 MHz (or 40 MHz), the size of the second bandwidth is 80 MHz, the first resource unit includes resource unit of 242 tones, the second resource unit includes resource unit of 242 tones, and the size of the tone shifting may be determined based on the difference between the number of tones allocated to the first guard tone and the number of tones allocated to the second guard tone.

For convenience of description, although scheduling of resource unit for one STA is disclosed, resource allocation for a plurality of STAs may be performed as described above.

The STA 1950 includes a processor 1960, a memory 1970, and a radio frequency unit 1980.

The RF unit 1980 may be coupled to the processor 1260 and may transmit/receive wireless signals.

The processor 1960 may implement the functions, processes, and/or methods proposed in the present invention. For example, the processor 1260 may be implemented to perform operations of the STA according to the embodiments of the present invention described above. The processor may perform operations of the STA in the embodiments of FIGS. 1 to 18.

For example, the processor 1960 may receive downlink data or transmit uplink data based on a resource unit (or wireless resource) scheduled by the AP.

The processor 1910 and 1960 may include application specific integrated circuits (ASICs), other chipsets, logic circuits, data processing devices, and/or converters for converting baseband signals and radio signals. The memory may include read-only memory (ROM), random access memory (RAM), flash memory, memory cards, storage media, and/or other storage devices. The RF unit 1930 and 1980 may include one or more antennas for transmitting and/or receiving wireless signals.

When the embodiment is implemented in software, the above-described techniques may be implemented with modules (processes, functions, and so on) that perform the functions described above. The modules may be stored in memory 1920, 1970 and executed by processors 1910, 1960. The memories 1920 and 1970 may be internal or external to the processors 1910 and 1960 and may be coupled to the processors 1910 and 1960 in various well known means.

What is claimed is:

1. A method for allocating wireless resources in bandwidths of different sizes in a wireless local area network (WLAN), the method comprising:
    determining, by an access point (AP), a first resource unit to be allocated to a station (STA) in a first bandwidth,
    wherein a first resource allocation start position of the first resource unit allocated in the first bandwidth is configured at the same position on the frequency as a second resource allocation start position of a second resource unit allocated in a second bandwidth,
    wherein a first guard allocation start position of a first guard tone contiguous to the first resource unit is configured to a frequency position different from a second guard allocation start position of a second guard tone contiguous to the second resource unit based on tone shifting,
    wherein the first bandwidth is 20 MHz,
    wherein the second bandwidth is 80 MHz,
    wherein the first resource unit includes 242 tones,
    wherein the second resource unit includes 242 tones,
    wherein a size of the tone shifting is determined based on difference between the number of tones allocated to the first guard tone and the number of tones allocated to the second guard tone,
    wherein the first resource unit further includes direct current (DC) tones,
    wherein the second resource unit further includes null tones,
    wherein an allocation position on a frequency axis of the DC tones corresponds to an allocation position on the frequency axis of the null tones, and
    wherein the number of the DC tones is the same as the number of the null tones; and
    transmitting, by the AP, a physical layer protocol data unit (PPDU) to the STA based on the first resource unit.

2. The method of claim 1,
wherein the second resource unit is capable of being classified into a combination of a resource unit of 56 tones and a resource unit of 26 tones, and
wherein leftover tones remaining from the second resource unit are used as the second guard tone when the second resource unit is classified into the combination.

3. An access point (AP) for allocating wireless resources in bandwidths of different sizes in a wireless local area network (WLAN), the AP comprising:
a transceiver configured to transmit and receive radio signal; and
a processor configured operatively coupled to the transceiver,
wherein the processor is configured to:
determine a first resource unit to be allocated to a station (STA) in a first bandwidth,
wherein a first resource allocation start position of the first resource unit allocated in the first bandwidth is configured at the same position on the frequency as a second resource allocation start position of a second resource unit allocated in a second bandwidth,
wherein a first guard allocation start position of a first guard tone contiguous to the first resource unit is configured to a frequency position different from a second guard allocation start position of a second guard tone contiguous to the second resource unit based on tone shifting,
wherein the first bandwidth is 20 MHz,
wherein the second bandwidth is 80 MHz,
wherein the first resource unit includes 242 tones,
wherein the second resource unit includes 242 tones,
wherein a size of the tone shifting is determined based on difference between the number of tones allocated to the first guard tone and the number of tones allocated to the second guard tone,
wherein the first resource unit further includes direct current (DC) tones,
wherein the second resource unit further includes null tones,
wherein an allocation position on a frequency axis of the DC tones corresponds to an allocation position on the frequency axis of the null tones, and
wherein the number of the DC tones is the same as the number of the null tones, and
control the transceiver to transmit a physical layer protocol data unit (PPDU) to the STA based on the first resource unit.

4. The AP of claim 3,
wherein the second resource unit is capable of being classified into a combination of a resource unit of 56 tones and a resource unit of 26 tones, and
wherein leftover tones remaining from the second resource unit are used as the second guard tone when the second resource unit is classified into the combination.

* * * * *